(12) United States Patent
Rasch et al.

(10) Patent No.: US 12,112,264 B2
(45) Date of Patent: Oct. 8, 2024

(54) DYNAMIC CONFIGURATION OF READOUT CIRCUITRY FOR DIFFERENT OPERATIONS IN ANALOG RESISTIVE CROSSBAR ARRAY

(71) Applicant: International Business Machines Corporation, Armonk, NY (US)

(72) Inventors: Malte Johannes Rasch, Chappaqua, NY (US); Tayfun Gokmen, Briarcliff Manor, NY (US); Seyoung Kim, Pohang (KR)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 17/121,930

(22) Filed: Dec. 15, 2020

(65) Prior Publication Data

US 2022/0188628 A1 Jun. 16, 2022

(51) Int. Cl.
*G06N 3/08* (2023.01)
*G06N 3/063* (2023.01)

(52) U.S. Cl.
CPC ............... *G06N 3/08* (2013.01); *G06N 3/063* (2013.01)

(58) Field of Classification Search
CPC ............ G06N 3/08; G06N 3/063; G06N 3/04; G06N 3/06
See application file for complete search history.

(56) References Cited

U.S. PATENT DOCUMENTS 9,646,243 B1  5/2017 Gokmen
9,779,355 B1  10/2017 Leobandung
(Continued)

FOREIGN PATENT DOCUMENTS

CN  110648706 A  1/2020
CN  112005252 A  11/2020

OTHER PUBLICATIONS

S. Kim, T. Gokmen, H.-M. Lee and W. E. Haensch, "Analog CMOS-based resistive processing unit for deep neural network training," 2017 IEEE 60th International Midwest Symposium on Circuits and Systems (MWSCAS), Boston, MA, USA, 2017, pp. 422-425 (Year: 2017).*

(Continued)

*Primary Examiner* — Kamran Afshar
*Assistant Examiner* — Brian J Hales
(74) *Attorney, Agent, or Firm* — Erik Johnson; Ryan, Mason & Lewis LLP

(57) ABSTRACT

A device which comprises an array of resistive processing unit (RPU) cells, first control lines extending in a first direction across the array of RPU cells, and second control lines extending in a second direction across the array of RPU cells. Peripheral circuitry comprising readout circuitry is coupled to the first and second control lines. A control system generates control signals to control the peripheral circuitry to perform a first operation and a second operation on the array of RPU cells. The control signals include a first configuration control signal to configure the readout circuitry to have a first hardware configuration when the first operation is performed on the array of RPU cells, and a second configuration control signal to configure the readout circuitry to have a second hardware configuration, which is different from the first hardware configuration, when the second operation is performed on the array of RPU cells.

20 Claims, 12 Drawing Sheets

(56) References Cited

U.S. PATENT DOCUMENTS

| | | |
|---|---|---|
| 10,134,472 B1 | 11/2018 | Leobandung et al. |
| 10,340,002 B1 | 7/2019 | Kim et al. |
| 10,373,051 B2 | 8/2019 | Gokmen et al. |
| 10,387,778 B2 | 8/2019 | Gokmen et al. |
| 10,490,272 B2 | 11/2019 | Lin et al. |
| 10,726,895 B1 | 7/2020 | Kim et al. |
| 10,726,914 B2 | 7/2020 | Chung |
| 10,740,671 B2 | 8/2020 | Gokmen |
| 11,157,810 B2 | 10/2021 | Kim et al. |
| 2018/0293209 A1 | 10/2018 | Gokmen et al. |
| 2019/0188569 A1 | 6/2019 | Naumov |
| 2019/0251430 A1 | 8/2019 | Gokmen et al. |
| 2019/0318239 A1 | 10/2019 | Kim et al. |
| 2019/0372586 A1 | 12/2019 | Zhang et al. |
| 2020/0117984 A1 | 4/2020 | Li et al. |
| 2020/0118619 A1 | 4/2020 | Narayanan et al. |
| 2020/0279012 A1 | 9/2020 | Khaddam-Aljameh et al. |
| 2020/0380348 A1 | 12/2020 | Rasch et al. |
| 2020/0380349 A1 | 12/2020 | Rasch et al. |

OTHER PUBLICATIONS

Gokmen, Tayfun, and Yurii Vlasov. "Acceleration of deep neural network training with resistive cross-point devices: Design considerations." Frontiers in neuroscience 10 (2016) (Year: 2016).*

M. J. Rasch, T. Gokmen and W. Haensch, "Training Large-scale Artificial Neural Networks on Simulated Resistive Crossbar Arrays," in IEEE Design & Test, vol. 37, No. 2, pp. 19-29, Apr. 2020 (Year: 2020).*

Gokmen, Tayfun, Murat Onen, and Wilfried Haensch. "Training deep convolutional neural networks with resistive cross-point devices." Frontiers in neuroscience 11 (2017) (Year: 2017).*

International Search Report and Written Opinion of PCT/CN2021/125968, Jan. 26, 2022, 9 pages.

A. Siemon et al., "A Complementary Resistive Switch-based Crossbar Array Adder," IEEE Journal on Emerging and Selected Topics in Circuits and Systems, vol. 5, No. 1, Mar. 2016, 12 pages.

J.M. Correll et al., "A Fully Integrated Reprogrammable CMOS-RRAM Compute-in-Memory Coprocessor for Neuromorphic Applications," IEEE Journal on Exploratory Solid-State Computational Devices and Circuits, vol. 6, No. 1, Jul. 6, 2020, pp. 36-44.

J.-S. Lee et al., "Capacitor Array Structure and Switch Control for Energy-Efficient SAR Analog-to-Digital Converters," IEEE International Symposium on Circuits and Systems, May 18-21, 2008, pp. 236-239.

M.J. Rasch et al., "Training Large-Scale ANNs on Simulated Resistive Crossbar Arrays," arXiv:1906.02698v1, Jun. 6, 2019, 15 pages.

S. Kim et al., "Analog CMOS-based Resistive Processing Unit for Deep Neural Network Training," IEEE 60th International Midwest Symposium on Circuits and Systems (MWSCAS), Aug. 6-9, 2017, 4 pages.

T. Gokmen et al., "Acceleration of Deep Neural Network Training with Resistive Cross-Point Devices: Design Considerations," Frontiers in Neuroscience, vol. 10, No. 333, Jul. 21, 2016, 13 pages.

* cited by examiner $y = W \times x$
FORWARD PASS $z = W^T \times \delta$
BACKWARD PASS $w_{ij} \leftarrow w_{ij} + \eta x_i \times \delta_j$
WEIGHT UPDATE

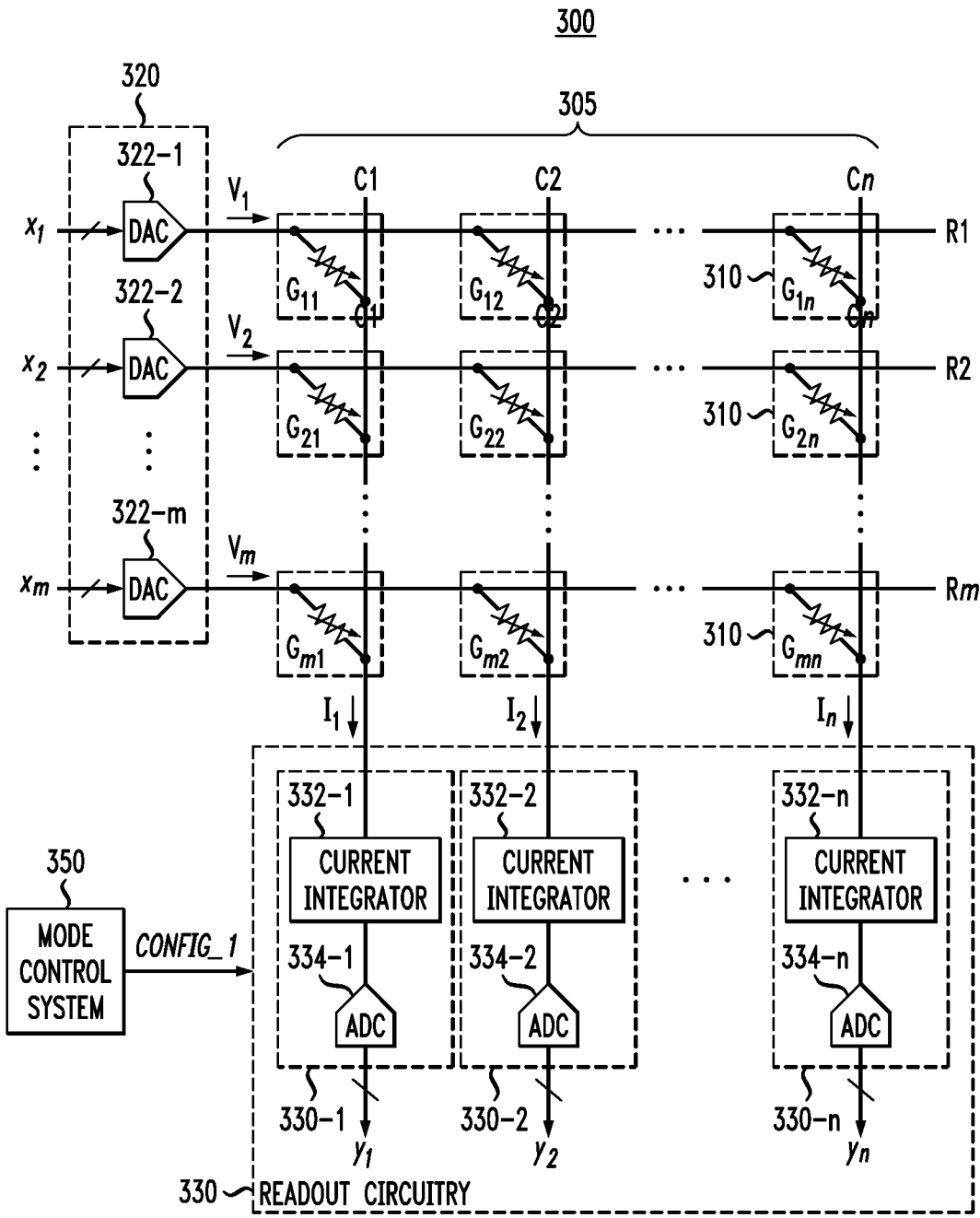

BACKWARD PASS

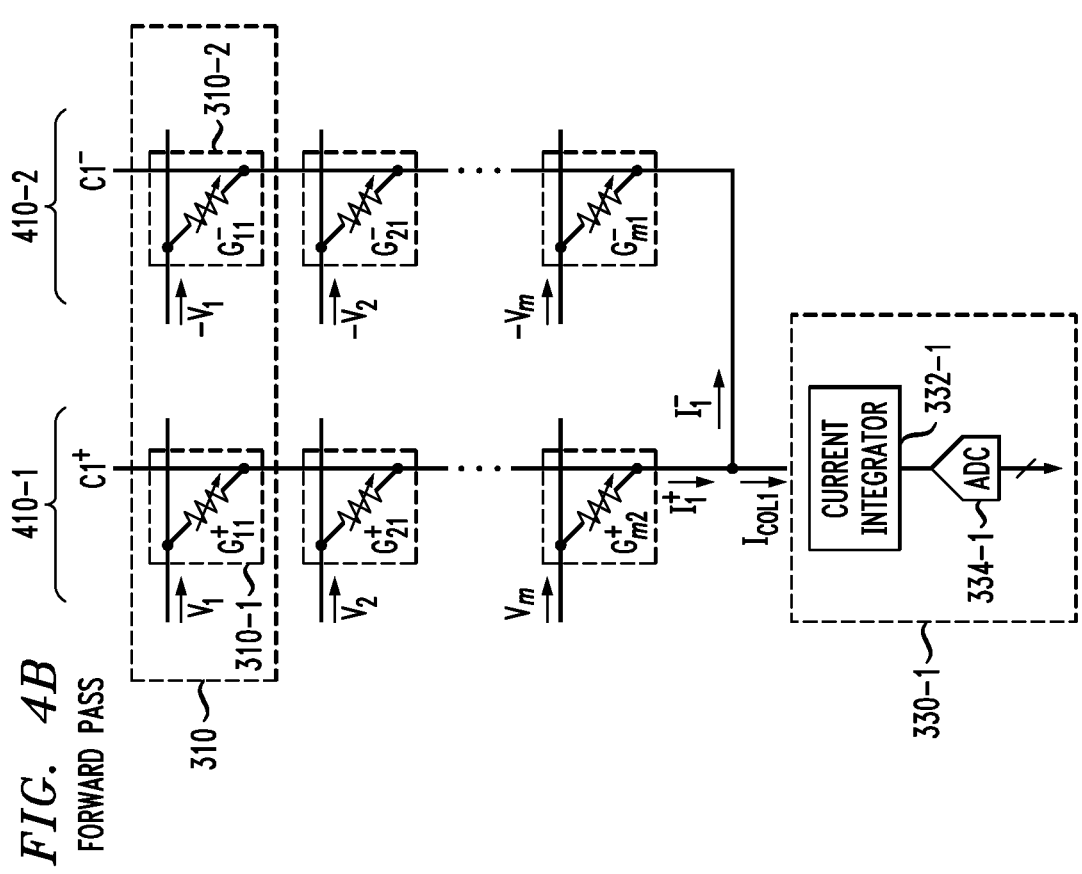
FIG. 4A FORWARD PASS
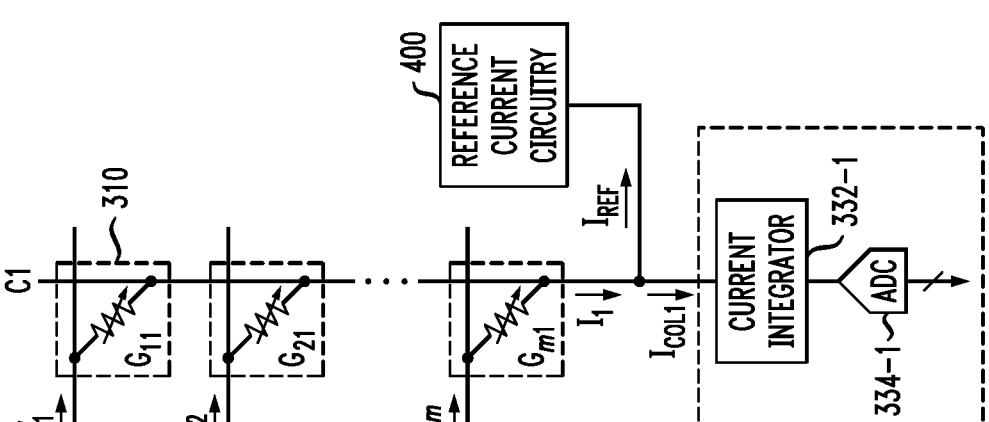
FIG. 4B FORWARD PASS

BACKWARD PASS

BACKWARD PASS

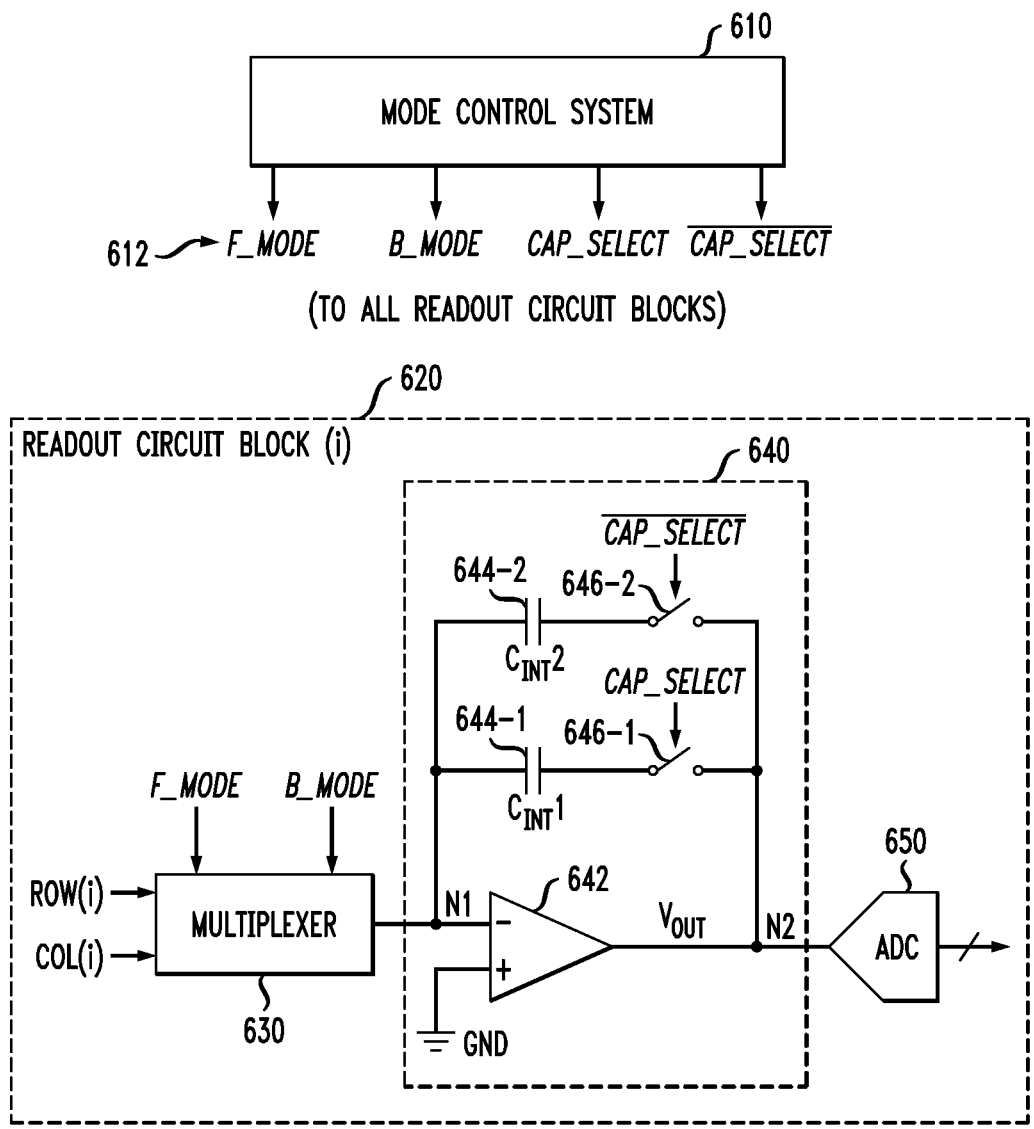

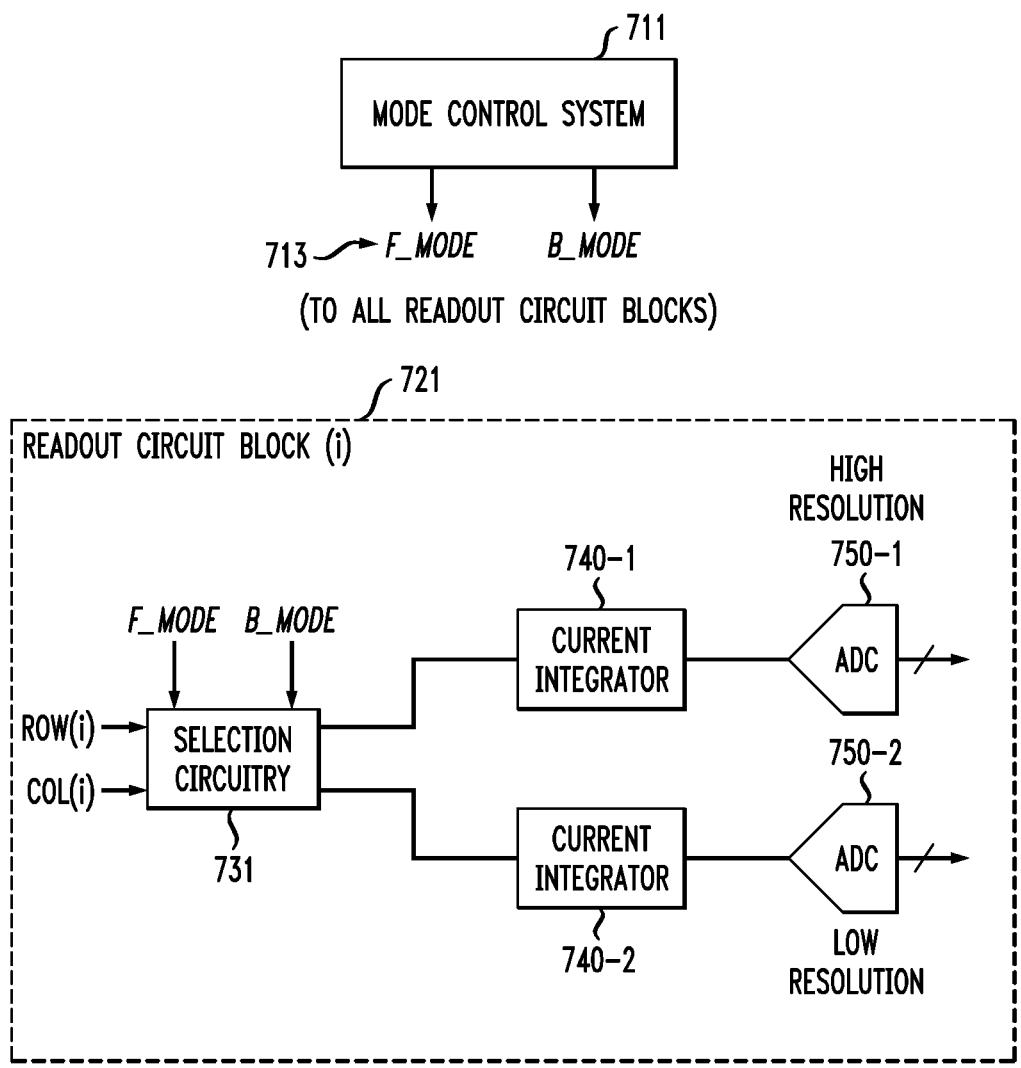

DYNAMIC CONFIGURATION OF READOUT CIRCUITRY FOR DIFFERENT OPERATIONS IN ANALOG RESISTIVE CROSSBAR ARRAY

BACKGROUND

This disclosure relates generally to analog resistive processing systems for neuromorphic computing, and techniques for controlling peripheral circuitry of an analog resistive processing system to perform various operations on an array of resistive processing unit (RPU) cells of the analog resistive processing system. Information processing systems such as Neuromorphic computing systems and artificial neural network (ANN) systems are utilized in various applications such as machine learning and inference processing for cognitive recognition and computing. Such systems are hardware-based systems that generally include a large number of highly interconnected processing elements (referred to as "artificial neurons") that operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of RPU cells having tunable resistive memory devices, the conductance states of the RPU cells are encoded or otherwise mapped to the synaptic weights.

SUMMARY

Embodiments of the disclosure include analog resistive processing systems for neuromorphic computing, and techniques for dynamically configuring a hardware configuration of peripherical circuitry, such as readout circuitry, of an analog resistive processing system when performing different operations on an array of RPU cells of the analog resistive processing system.

An exemplary embodiment includes a device which comprises an array of RPU, first control lines extending in a first direction across the array of RPU cells, and second control lines extending in a second direction across the array of RPU cells. Each RPU cell is connected at an intersection of one of the first control lines and one of the second control lines. Peripheral circuitry is coupled to the first control lines and to the second control lines, wherein the peripheral circuitry comprises readout circuitry. A control system is operatively coupled to the peripheral circuitry. The control system generates control signals to control the peripheral circuitry to perform a first operation on the array of RPU cells and to perform a second operation on the array of RPU cells. The control signals comprise a first configuration control signal to configure the readout circuitry to have a first hardware configuration when the first operation is performed on the array of RPU cells, and a second configuration control signal to configure the readout circuitry to have a second hardware configuration, which is different from the first hardware configuration, when the second operation is performed on the array of RPU cells.

Other embodiments will be described in the following detailed description of exemplary embodiments, which is to be read in conjunction with the accompanying figures.

BRIEF DESCRIPTION OF THE DRAWINGS

FIG. 3A schematically illustrates a method for configuring a computing system comprising an array of resistive processing unit cells to perform a forward pass operation, according to an exemplary embodiment of the disclosure.

FIGS. 4A and 4B schematically illustrate methods for configuring a computing system comprising an array of resistive processing unit cells to perform a forward pass operation using signed weight values, according to exemplary embodiments of the disclosure.

FIG. 6 schematically illustrates a system to dynamically configure readout circuitry for different operations performed on an array of resistive processing unit cells, according to an exemplary embodiment of the disclosure.

FIG. 7B schematically illustrates a system to dynamically configure readout circuitry for different operations performed on an array of resistive processing unit cells, according to another exemplary embodiment of the disclosure.

DETAILED DESCRIPTION

Figure 1:
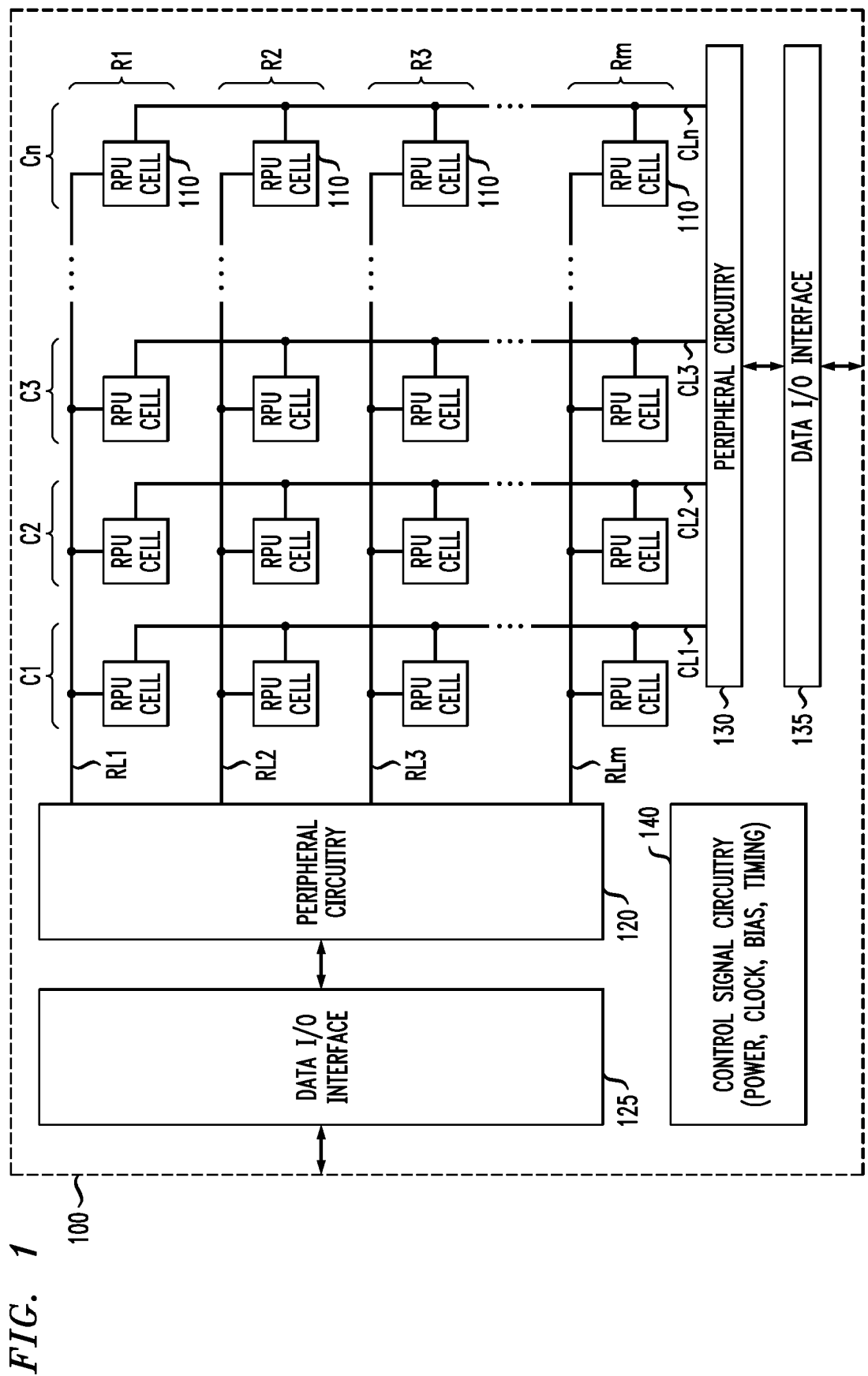
FIG. 1 schematically illustrates a computing system which comprises an array of resistive processing unit cells, according to an exemplary embodiment of the disclosure.

Embodiments of the invention will now be described in further detail with regard to analog resistive processing systems for neuromorphic computing, and techniques for dynamically configuring peripherical circuitry, such as readout circuitry, of an analog resistive processing system to perform different operations on an array of resistive processing unit (RPU) cells of the analog resistive processing system. For example, as explained in further detail below, in some embodiments, the hardware configuration of the readout circuitry of an analog resistive processing system is dynamically configured to have to have different operating signal ranges for different operations (e.g., forward and backward pass operations of a neural network training process) that are performed on array of RPU cells of the analog resistive processing system.

It is to be understood that the various features as shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

Exemplary embodiments of the disclosure include in-memory computing systems or computational memory systems, which utilize an array of RPU cells for a dual purpose of storing data and processing the data to perform some computational tasks. In some embodiments, the RPU cells implement resistive memory devices such as resistive random-access memory (ReRAM) devices, phase-change memory (PCM) devices, etc., which have a tunable conductance (G) with variable conductance states over a range from a min conductance (Gmin) to a maximum conductance (Gmax). As noted above, neuromorphic computing systems and ANN systems are types of in-memory computing systems in which artificial neurons are connected using artificial synaptic devices to provide synaptic weights which represent the strength of connection between two artificial neurons. The synaptic weights can be implemented using tunable resistive memory devices, wherein the variable conductance states are used to represent the synaptic weights and to perform computations (e.g., vector-matrix multiplication). The conductance states of the analog resistive memory devices are encoded or otherwise mapped to synaptic weights.

Various types of artificial neural networks, such as deep neural networks (DNNs) and convolutional neural networks (CNNs) implement neuromorphic computing architectures for machine learning applications such as image recognition, object recognition, speech recognition, etc. The in-memory computations associated with such neural networks include, e.g., training computations in which the synaptic weights of the resistive memory cells are optimized by processing a training dataset, and forward inference computations in which the trained neural networks are used for to process input data for purposes of, e.g., classifying the input data, predicting events based on the input data, etc.

DNN training generally relies on a backpropagation algorithm which includes three repeating cycles: forward, backward and weight update, which are repeated many times until a convergence criterion is met. The forward and backward cycles mainly involve computing vector-matrix multiplication in forward and backward directions. This operation can be performed on a 2D array of analog resistive memory cells. In forward cycle, stored conductance values of the resistive memory devise in the 2D array form a matrix, and an input vector is transmitted as voltage pulses through each input row of the 2D array. In a backward cycle, voltage pulses are supplied from columns as an input, and a vector-matrix product is computed on the transpose of a matrix. The weight update involves calculating a vector-vector outer product which consists of a multiplication operation and an incremental weight update to be performed locally in each resistive memory cell within the 2D array.

A stochastically trained DNN comprising arrays of RPU cells can have synaptic weights implemented using tunable resistive devices. In some embodiments, each RPU cell 110 in the computing system 100 comprises a resistive element with a conductance value that represents a matrix element or weight of the RPU cell 110. In some embodiments, the resistive elements of the RPU cells 110 are implemented using resistive devices such as resistive switching devices (interfacial or filamentary switching devices), ReRAM devices, memristor devices, PCM devices, etc., and other types of devices which have a tunable conductance (or tunable resistance level) which can be programmatically adjusted within a range of a plurality of different conductance levels to tune the weight of the RPU cell 110. In some embodiments, the variable conductance elements of the RPU cells 110 can be implemented using ferroelectric devices such as ferroelectric field-effect transistor devices. Furthermore, in some embodiments, the RPU cells 110 can be implemented using an analog CMOS-based framework in which each RPU cell 110 comprises a capacitor and a read transistor. With the framework, the capacitor serves as a memory element of the RPU cell 110 and stores a weight value in the form a capacitor voltage, wherein the capacitor voltage is applied to a gate terminal of the read transistor to modulate a channel resistance of the read transistor based on the level of the capacitor voltage, and wherein the channel resistance of the read transistor represents the conductance of the RPU cell and is correlated to a level of a read current that is generated based on the channel resistance.

To properly train a DNN and achieve high-accuracy, the operating characteristics of the tunable resistive devices should meet a stringent set of specifications of acceptable RPU device parameters that a given DNN algorithm can tolerate without significant error penalty. These specifications include, for example, variations in the switching characteristics of the resistive memory device, such as, minimum incremental conductance change ($\pm\Delta g_{min}$) due to a single potentiation pulse, symmetry in up and down conductance changes, tunable range of the conductance values, etc.

FIG. 1 schematically illustrates a computing system which comprises an array of resistive processing unit cells, according to an exemplary embodiment of the disclosure. More specially, FIG. 1 schematically illustrates a computing system 100 (e.g., neuromorphic computing system) which comprises a two-dimensional (2D) crossbar array of RPU cells 110 arranged in a plurality of rows R1, R2, R3, . . . , Rm, and a plurality of columns C1, C2, C3, . . . , Cn. The RPU cells 110 in each row R1, R2, R3, . . . , Rm are commonly connected to respective row control lines RL1, RL2, RL3, . . . , RLm (collectively, row control lines RL). The RPU cells 110 in each column C1, C2, C3, . . . , Cn are commonly connected to respective column control lines CL1, CL2, CL3, . . . , CLn (collectively, column control lines CL). Each RPU cell 110 is connected at (and between) a cross-point (or intersection) of a respective one of the row and column control lines. In one example embodiment, the computing system 100 comprises a 4,096×4,096 array of RPU cells 110.

The computing system 100 further comprises peripheral circuitry 120 connected to the row control lines RL1, RL2, RL3, . . . , RLm, as well peripheral circuitry 130 connected to the column control lines CL1, CL2, CL3, . . . , CLn. Further, the peripheral circuitry 120 is connected to a data input/output (I/O) interface 125, and the peripheral circuitry 130 is connected to a data I/O interface 135. The computing system 100 further comprises control signal circuitry 140 which comprises various types of circuit blocks such as power, clock, bias and timing circuitry to provide power distribution and control signals and clocking signals for operation of the peripheral circuitry 120 and 130 of the computing system 100.

In a neuromorphic computing application, the RPU cells 110 comprise artificial synapses that provide weighted connections between pre-neurons and post-neurons. Multiple pre-neurons and post-neurons are connected through the 2D crossbar array of RPU cells 110, which naturally expresses a fully-connected neural network. In some embodiments, the computing system 100 is configured to perform DNN or CNN computations wherein a conductance of each RPU cell 110 represents a matrix element or weight $w_{ij}$, which can be updated or accessed through operations of the peripheral circuitry 120 and 130 (wherein $w_{ij}$, denotes a weight value for the $i^{th}$ row and the $j^{th}$ column in the array of RPU cells 110). As noted above, DNN training generally relies on a backpropagation process which comprises three repeating cycles: a forward cycle, a backward cycle, and a weight update cycle. The computing system 100 can be configured to perform all three cycles of the backpropagation process in parallel, thus potentially providing significant acceleration in DNN training with lower power and reduced computation resources. The computing system 100 can be configured to perform vector-matrix multiplication operations in the analog domain in a parallel manner.

While the row control lines RL and column control lines CL are each shown in FIG. 1 as a single line for ease of illustration, it is to be understood that each row and column control line can include two or more control lines connected to the RPU cells 110 in the respective rows and columns, depending on the implementation and the specific architecture of the RPU cells 110. For example, in some embodiments, each row control line RL can include a complementary pair of word lines for a given RPU cell 110. Moreover, each column control line CL may comprise multiple control lines including, e.g., one or more source lines (SL) and one or more bit lines (BL).

The peripheral circuitry 120 and 130 comprises various circuit blocks which are connected to the respective rows and columns in the 2D array of RPU cells 110, and which are configured to perform vector-matrix multiply functions, matrix-vector multiply functions, and outer product update operations to implement the forward, backward and weight update operations of a backpropagation process (for neural network training), as well inference processing using a trained neural network. For example, in some embodiments, to support RPU cell read/sensing operations (e.g., read a weight value of given RPU cell 110), the peripheral circuitry 120 and 130 comprises pulse-width modulation (PWM) circuitry and read pulse driver circuitry to generate and apply PWM read pulses to the RPU cells 110, in response to input vector values (read input values) received during forward/backward cycles.

More specifically, in some embodiments, the peripheral circuitry 120 and 130 comprises digital-to-analog (D/A) converter circuitry that is configured to receive digital input vectors (to be applied to rows or columns) and convert the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values which are represented by output currents, wherein the weights of the RPU cells 110 are read out by measuring the output currents.

The peripheral circuitry 120 and 130 further comprises current integrator circuitry and analog-to-digital (A/D) converter circuitry to integrate read currents ($I_{READ}$) which are output and accumulated from the connected RPU cells 110 and convert the integrated currents into digital values (read output values) for subsequent computation. In particular, the currents generated by the RPU cells 110 are summed on the columns (or rows) and this total current is integrated over a measurement time, tmeas, by current readout circuitry of the peripheral circuitry 120 and 130. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

The data I/O interfaces 125 and 135 are configured to interface with a digital processing core, wherein the digital processing core is configured to process input/outputs to the computing system 100 (neural core) and route data between different RPU arrays. The data I/O interfaces 125 and 135 are configured to (i) receive external control signals and data from a digital processing core and provide the received control signals and data to the peripheral circuitry 120 and 130, and (ii) receive digital read output values from peripheral circuitry 120 and 130, and send the digital read output values to a digital processing core for processing. In some embodiments, the digital processing core implements a non-linear function circuitry which calculates activation functions (e.g., sigmoid neuron function, softmax, etc.) and other arithmetical operations on data that is to be provided to a next or previous layer of a neural network.

As is known in the art, fully connected DNNs comprise stacks of fully connected layers such that a signal propagates from an input layer to an output layer by going through series of linear and non-linear transformations. The entire DNN expresses a single differentiable error function that maps the input data to class scores at the output layer. Typically, a DNN is trained using a simple stochastic gradient decent (SGD) scheme, in which an error gradient with respect to each parameter is calculated using the backpropagation algorithm. The backpropagation algorithm is composed of three cycles, forward, backward and weight update that are repeated many times until a convergence criterion is met. The forward and backward cycles mainly involve computing vector-matrix multiplication operations in forward and backward directions using the 2D crossbar array of RPU cells 110 of the computing system shown in FIG. 1.

Figure 2A:
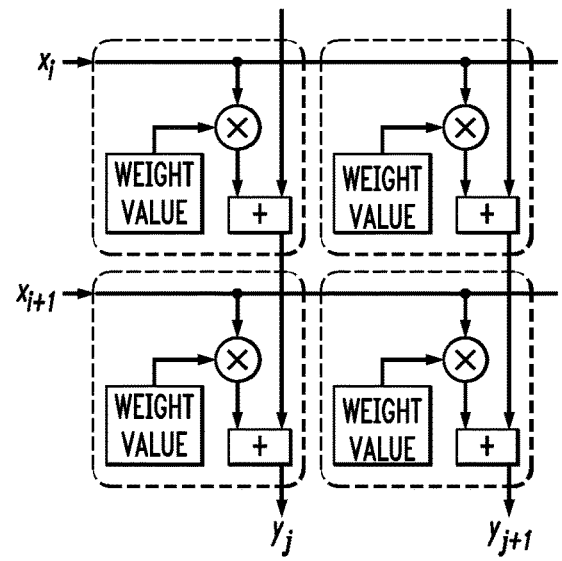
FIG. 2A schematically illustrates a forward pass operation of a backpropagation process, which can be performed using the computing system of FIG. 1.
Figure 2B:
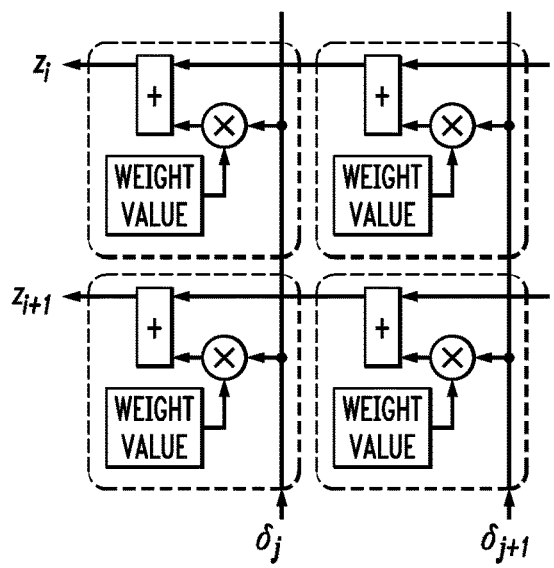
FIG. 2B schematically illustrates a backward pass operation of a backpropagation process, which can be performed using the computing system of FIG. 1.
Figure 2C:
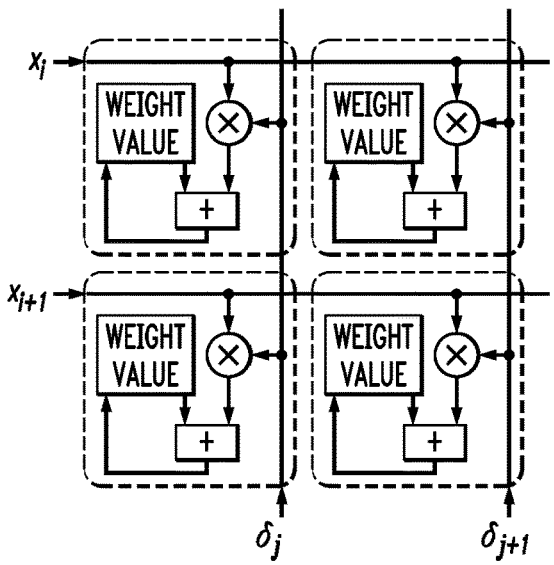
FIG. 2C schematically illustrates a weight update operation of a backpropagation process, which can be performed using the computing system of FIG. 1.

In the computing system 100 of FIG. 1, the conductance values $g_{ij}$ in the 2D crossbar array of RPU cells form a matrix W of weight values $w_{ij}$. In a forward cycle (FIG. 2A), an input vector (in the form of voltage pulses) is transmitted through each of the input rows in the 2D crossbar array to perform a vector-matrix multiplication in the RPU cells 110. In a backward cycle FIG. 2B), voltage pulses supplied from the columns are input to the RPU cells 110, and a vector-matrix product is computed on the transpose of the weight matrix W values. In contrast to forward and backward cycles, implementing the weight update on a 2D crossbar array of resistive devices requires calculating a vector-vector outer product which consists of a multiplication operation and an incremental weight update to be performed locally at each cross-point RPU device in the array. FIGS. 2A, 2B, and 2C schematically illustrate respective forward pass, backward pass, and weight update operations of a backpropagation algorithm which can be performed using the computing system 100 of FIG. 1.

For a single fully connected layer where N input neurons are connected to M output (or hidden) neurons, the forward pass (FIG. 2A) involves computing a vector-matrix multiplication y=Wx, where the vector x of length N represents the activities of the input neurons and the matrix W of size M×N stores the weight values between each pair of input and output neurons. The resulting vector y of length M is further processed by performing a non-linear activation on each of the elements and then passed to the next layer. Once the information reaches the final output layer, an error signal is calculated and back propagated through the network. In the forward cycle, the stored conductance values in the crossbar array of RPU cells 110 form a matrix, whereas the input vector is transmitted as voltage pulses through each of the input rows R1, R2, R3, . . . , Rm.

The backward cycle (FIG. 2B) on a single layer also involves a vector-matrix multiplication on the transpose of a weight matrix, $z=W^T\delta$, where W denotes the weight matrix, where the vector $\delta$ of length M represents the error calculated by the output neurons, and where the vector z of length N is further processed using the derivative of neuron non-linearity and then passed down to the previous layers. In a backward cycle, voltage pulses are supplied to the RPU cells 110 from columns CL1, CL2, CL3, . . . , CLn as an input, and the vector-matrix product is computed on the transpose of the weight matrix W.

Finally, in an update cycle (FIG. 2C), the weight matrix W is updated by performing an outer product of the two vectors that are used in the forward and the backward cycles. In particular, implementing the weight update on a 2D crossbar array of resistive devices locally and all in parallel, independent of the array size, requires calculating a vector-vector outer product which consists of a multiplication operation and an incremental weight update to be performed locally at each cross-point (RPU cell 110) in the computing system of FIG. 1. As schematically illustrated in FIG. 2C, the weight update process is computed as: $w_{ij} \leftarrow w_{ij} + \eta x_i \times \delta_j$, where $w_{ij}$ represents the weight value for the $i^{th}$ row and the $j^{th}$ column (for simplicity layer index is omitted), where $x_i$ is the activity at the input neuron, $\delta_j$ is the error computed by the output neuron, and where $\eta$ denotes a global learning rate.

In summary, all operations on the weight matrix W can be implemented using the 2D crossbar array of two-terminal RPU device with M rows and N columns where the stored conductance values in the crossbar array form the matrix W. In the forward cycle, input vector x is transmitted as voltage pulses through each of the rows and the resulting vector y can be read as current signals from the columns. Similarly, when voltage pulses are supplied from the columns as an input in the backward cycle, then a vector-matrix product is computed on the transpose of the weight matrix $W^T$. Finally, in the update cycle, voltage pulses representing vectors x and $\delta$ are simultaneously supplied from the rows and the columns. In the update cycle, each RPU cell 110 performs a local multiplication and summation operation by processing the voltage pulses coming from the column and the row and hence achieving an incremental weight update.

To determine the product of the xi and $\delta$j vectors for the weight update cycle, stochastic translator circuitry in the peripheral circuitry 120 and 130 is utilized to generate stochastic bit streams that represent the input vectors xi and $\delta$j. The stochastic bits streams for the vectors xi and $\delta$j are fed through rows and columns in the 2D crossbar array of RPU cells, wherein the conductance of a given RPU cell will change depending on the coincidence of the xi and $\delta$j stochastic pulse streams input to the given RPU cell. The vector cross product operations for the weight update operation are implemented based on the known concept that that coincidence detection (using an AND logic gate operation) of stochastic streams representing real numbers is equivalent to a multiplication operation. All three operating modes described above allow the RPU cells forming the neural network to be active in all three cycles and, thus, enable a very efficient implementation of the backpropagation algorithm to compute updated weight values of the RPU cells during a DNN training process.

During the forward and backward pass operations where vector-matrix multiplications are performed on the RPU array, the digital input vectors (x or $\delta$) are converted to analog input vectors that are transmitted as voltage pulses with a fixed amplitude and tunable durations over the rows and columns. In some embodiments, the maximal pulse duration represents unity with regard to an integration time ($T_{meas} \rightarrow 1$), wherein all pulse durations are scaled accordingly depending on the values of $x_i$ or $\delta_j$. This scheme works optimally for the forward cycle where all $x_i$ in x are with a given range, e.g., [−1,1]. However, this scheme becomes problematic for the backward cycle, as there are no guarantees for the range of the error signal values in $\delta$. For instance, all $\delta_j$ in $\delta$ may become significantly smaller than unity ($\delta \ll 1$) as a training process progresses and the classification errors become increasingly smaller. In this instance, the signal strength of the output signals, which are generated during a backward pass operation as a result of low signal strength of the input error signals $\delta_j$ of an input vector $\delta$, may be too small and not compatible with the full scale operating ranges of the readout circuitry.

In some embodiments, a noise management system can be implemented in the RPU array to scale the input error signals $\delta_j$ of an input error vector $\delta$ based on the maximum input error signal $\delta_j$ of the input error vector $\delta$, so that the input error signals $\delta_j$ fall between e.g., [−1,1], similar to the full input range of the input signals $x_i$ of an input vector that is applied to the RPU array during a forward pass operation. However, in some instances, the process of matching the input signals ranges for the forward and backward pass operations may be insufficient to match the resulting output signals ranges for the forward and backward pass operations due to, e.g., the manner in which neural networks (e.g., DNNs) are trained.

In particular, for a forward pass operation, the distribution of Wx is large because the values of the input vector x and the weight values of the weight matrix W are typically correlated (e.g., achieved through the DNN learning which is meant to increase such correlations), whereas for $W^T\delta$ for the backward pass operation, the error vector $\delta$ and the matrix $W^T$ are typically uncorrelated vectors and thus have a result close to zero. Consequently, the output signal strengths of the forward and backward pass operations are significantly different. Furthermore, another reason that weak output signals are generated during a backward pass operation is that many elements $\delta_j$ of an input error vector $\delta$ for many DNNs are typically zero or very close to zero. In this instance, scaling the values $\delta_j$ of the input error vector $\delta$ may not significantly increase the signal strength of the output signals generated by the backward pass operation, even if the input range of the values $\delta_j$ of the input error vector $\delta$ are matched to the input range (e.g., [−1,1]) of the input signals $x_i$ of the input vector x for the forward pass operation.

For at least the above-noted reasons, the output signals that are generated as a result of vector-matrix multiplication operations performed during the backward pass operations can be too small and not readily detectable or quantizable in instances where the readout circuitry (which is shared for the forward and backward pass operations) is configured to have a fixed output signal bound b (e.g., operating signal range) which is more optimal for the range of output signals that are generated during the forward pass operations. For instance, the fixed output signal bound b is a result of the current integrator circuits of the shared readout circuitry having a fixed size integration capacitor, or the ADC circuit of the shared readout circuitry having a fixed ADC resolution, etc. In such instances, the analog output signals that are relatively small (e.g., close to zero) will be quantized to zero because of the finite ADC resolution.

This effect is particularly severe when the shared ADC circuit is configured to have a relatively small resolution (e.g., 3-bit, 4-bit, 5-bit resolution), where the ADC bin size (i.e., least significant bit (LSB) voltage) is relatively large. The use of shared readout circuitry (for forward and backward pass operations) having a fixed output bound b (e.g., same size integration capacitor and/or same ADC resolution, etc.) may be sufficient to effectively readout and quantize the voltage signals generated during the forward pass operations, but may be insufficient to effectively readout and quantize the voltage signals that are generated during the backward pass operations (which represent the error signals that are propagated through the neural network layers during the backward pass operations). Because the backward propagating error signals have much lower signal strength than the forward propagating signals, the fixed signal output bound b of the shared readout circuitry can lead to insufficient quantization of the backward propagating signals, which results in an effect referred to as "vanishing gradients."

As is known in the art, an ADC circuit converts an analog signal (continuous-time or continuous-amplitude analog signal) to a digital signal through a quantization process. The resolution of an ADC refers to a number of discrete values that the ADC can generate over an allowed range of analog input values. For example, an ADC with an 8-bit resolution can encode an analog input signal to one of 256 different levels ($2^8$=256), providing a dynamic range of 256:1. The values can represent the ranges from [0 to 255] (i.e., as unsigned integers) or from [−128 to 127] (i.e., as signed integers), depending on the application. The resolution of the ADC is also denoted by a least significant bit (LSB) voltage (also referred to as "voltage resolution"). The LSB of the ADC represents the smallest interval that can be detected and in the case of an 8-bit ADC, the LSB is approximately 1/256 or $3.9\times10^{-3}$. The LSB voltage (or voltage resolution) refers to a change in voltage that is needed to guarantee a change in the output code level. The voltage resolution of an ADC is equal to the allowed range of analog input voltage values (e.g., full scale operating voltage range) divided by the number of discrete intervals.

For example, assuming that the full-scale operating voltage range of the ADC is from −10V to +10V (where V can be microvolts (μV), millivolts (mV), etc.), the voltage resolution of an 8-bit ADC would be 20/256, which is approximately 0.078V. If the analog voltage values for a given operation (e.g., a backward pass) fall within a much smaller voltage range, e.g., [−0.1V to +0.1V] as compared to the full-scale operating voltage range [−10V to +10V] of the ADC, the effective voltage resolution for the smaller voltage range would be significantly limited due to the LSB of 0.078V which would cause any analog voltage signal with an absolute magnitude of less than 0.078V to be quantized as zero. In other words, with the smaller voltage range [−0.1V to +0.1V], the 8-bit ADC would not be able to ideally resolve voltage differences smaller than 0.078V. In this scenario, for the 8-bit ADC, it would be more desirable to enhance the voltage resolution of the 8-bit ADC to a greater number of discrete levels (e.g., 256 levels) to more effectively quantize the voltage values within the smaller voltage range (−0.1V to +0.1V). In some embodiments, a lower bit resolution with a smaller full-scale range can be implemented to measure smaller voltages.

Exemplary embodiments of the disclosure implement bound management techniques that are implemented in the analog domain by dynamically changing a configuration (e.g., hardware configuration) of the shared readout circuitry to provide different signal bounds for different operational modes, e.g., forward pass and backward pass operations, of the analog RPU crossbar array. In order to enhance the output signal for the backward pass operation when ($\delta\ll1$), various techniques can used to dynamically configure the shared readout circuitry to have a first configuration during the forward pass operation and to have a second configuration during the backward pass operation. In particular, in the forward pass operation, the shared readout circuitry is configured to have a first configuration in which the readout circuitry operates with a first output signal bound b1 (e.g., a first operating signal range), and in the backward pass operation, the shared readout circuitry is configured to operate with a second output signal bound b2 (e.g., a second operating signal range), wherein b2<b1.

FIG. 3A schematically illustrates a method for configuring a computing system comprising an array of resistive processing unit cells to perform a forward pass operation, according to an exemplary embodiment of the disclosure. In particular, FIG. 3A schematically illustrates a computing system 300 which comprises a crossbar array of RPU cells 305, wherein each RPU cell 310 in the array 305 comprises an analog non-volatile resistive element (represented as a variable resistor having a tunable conductance G) at the intersection of each row (R1, R2, . . . , Rm) and column (C1, C2, . . . , Cn). As depicted in FIG. 3A, the array of RPU cells 305 provides a matrix of conductance values Gij which are mapped to a matrix of synaptic weights Wij that are encoded by conductance values Gij (where i represents a row index and j denotes a column index) of the respective RPU cells 310. The array of RPU cells 305 represents an array of artificial programmable synaptic elements that connect the nodes (artificial neurons) of an upstream layer (e.g., input layer or intermediate layer) of an artificial neural network to the nodes (artificial neurons) of a next downstream layer (intermediate layer or output layer) of the artificial neural network.

For the forward pass operation, multiplexers in the peripheral circuitry of the computing system 300 are activated to selectively connect row line driver circuitry 320 to the row lines R1, R2, . . . , Rm. The row line driver circuitry 320 comprises plurality of DAC circuit blocks 322-1, 322-2, . . . , 322-m (collectively DAC circuit blocks 322) which are connected to respective row lines R1, R2, . . . , Rm. In addition, multiplexers in the peripheral circuitry of the computing system 300 are activated to selectively connect readout circuitry 330 to the column lines C1, C2, . . . , Cn. The readout circuitry 330 comprises a plurality of readout circuit blocks 330-1, 330-2, . . . , 330-n, which are connected to respective column lines C1, C2, . . . , Cn. The readout circuit blocks 330-1, 330-2, . . . , 330-n comprise respective current integrator circuitry 332-1, 332-2, . . . , 332-n, and respective ADC circuitry 334-1, 334-2, . . . , 334-n.

The forward pass operation in a neural network is performed to calculate neuron activations of a downstream layer (e.g., hidden layer or output layer) based on neuron activations of an upstream layer (e.g., input layer or hidden layer) and the synaptic weights that connect the neurons of the upstream layer to the neurons of the downstream layer. In FIG. 3A, the upstream neurons generate digital signals x=[$x_1, x_2, \ldots, x_m$] (referred to as input vector) representing the upstream neuron excitations), wherein the digital signals $x_1, x_2, \ldots, x_m$ are input to respective DAC circuit blocks 322-1, 322-2, . . . , 322-m which generate analog voltages V(t) (voltage as a function of time) signal on the row lines R1, R2, . . . , Rm which are proportional to the upstream neuron excitation, x=[$x_1, x_2, \ldots, x_m$].

In some embodiments, the DAC circuit blocks 322-1, 322-2, . . . , 322-m each comprise a pulse-width modulation circuitry and driver circuitry which is configured to generate pulse-width modulated (PWM) read pulses $V_1, V_2, \ldots, V_m$ that applied to the respective row lines R1, R2, . . . , Rm. More specifically, in some embodiments, the DAC circuit blocks 322-1, 322-2, . . . , 322-m are configured to perform a digital-to-analog conversion process using a time-encoding scheme where the input vectors are represented by fixed amplitude pulses (e.g., V=1V) with a tunable duration, wherein the pulse duration is a multiple of a prespecified time period (e.g., 1 nanosecond) and is proportional to the value of the input vector. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time $T_{meas}$). As shown in FIG. 3A, the resulting analog input voltages $V_1, V_2, \ldots V_m$ (e.g., read pulses), are applied to the row lines R1, R2, . . . , Rm.

During a forward pass operation, the analog input voltages $V_1, V_2, \ldots, V_m$ (e.g., read pulses), are applied to the row lines R1, R2, . . . , Rm, wherein each RPU cell 310 generates a corresponding read current $I_{READ}=V_i \times G_{ij}$ (based on Ohm's law), wherein $V_i$ denotes the analog input voltage applied to the given RPU cell 310 on the given row i and wherein Gij denotes the conductance value of the given RPU cell 310 (at the given row i and column j). As shown in FIG. 3A, the read currents that are generated by the RPU cells 310 on each column j are summed together (based on Kirchhoff's current law) to generate respective currents $I_1, I_2, \ldots, I_n$ at the output of the respective columns C1, C2, . . . , Cn. In this manner, the resulting column currents $I_1, I_2, \ldots, I_n$ represent the result of a vector-matrix multiplication operation that is performed in the forward pass operation, wherein the input voltage vector [$V_1, V_2, \ldots, V_m$] is multiplied by the conductance matrix G (of conductance values Gij) to generate an output current vector [$I_1, I_2, \ldots, I_n$], as illustrated in FIG. 3A. In particular, a given column current $I_j$ is computed as $I_j = \Sigma_{i=1}^{m} V_i G_{ij}$. For example, the column current $I_1$ for the first column C1 is determined as $I_1 = (V_1 G_{11} + V_2 G_{21} +, \ldots, + V_m G_{m1})$.

The resulting aggregate read currents $I_1, I_2, \ldots, I_n$ at the output of the respective columns C1, C2, . . . , Cn are input to respective readout circuit blocks 330-1, 330-2, . . . , 330-n of the readout circuitry 330. The aggregate read currents $I_1, I_2, \ldots, I_n$ are integrated by the respective current integrator circuits 332-1, 332-2, . . . , 332-n to generate respective output voltages, which are quantized by the respective ADC circuits 334-1, 334-2, . . . , 334-n to generate respective digital output signals $y_1, y_2, \ldots, y_n$ of an output vector y. The digital output signals $y_1, y_2, \ldots, y_n$ are processed and transmitted to the next downstream layer to continue the forward propagation operation. As data propagates forward through the neural network, vector-matrix multiplications are performed, wherein the hidden neurons/nodes take the inputs, perform a non-linear transformation, and then send the results to the next weight matrix. This process continues until the data reaches the output layer comprising output neurons/nodes. The output neurons/nodes evaluate classification errors, and generate classification error signals δ which are propagated back through the neural network using backward pass operations. The error signals δ can be determined as a difference between the results of the forward inference classification (estimated labels) and the correct labels at the output layer of the neural network.

Figure 3B:
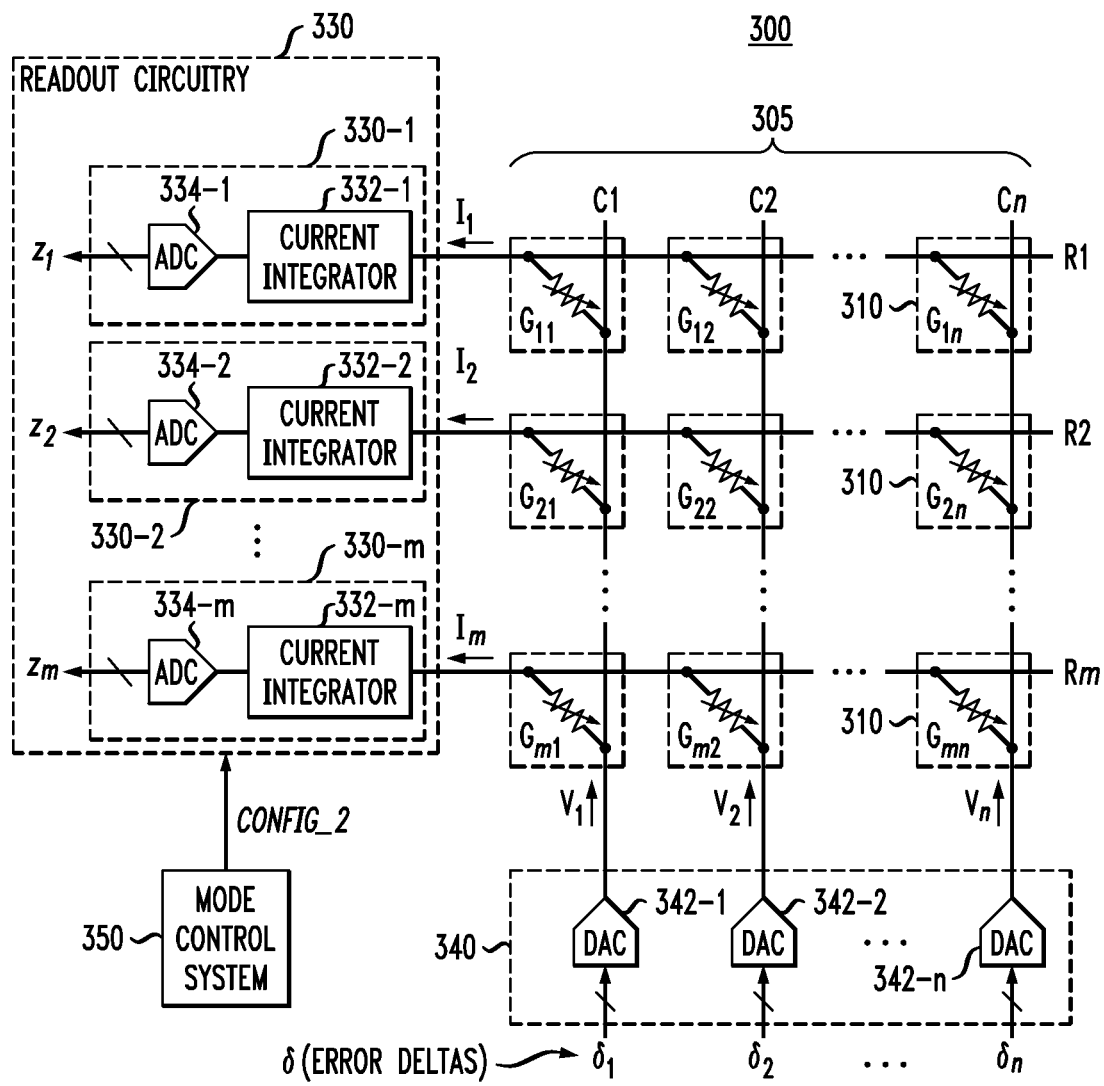
FIG. 3B schematically illustrates a method for configuring a computing system comprising an array of resistive processing unit cells to perform a backward pass operation, according to an exemplary embodiment of the disclosure.

FIG. 3B schematically illustrates a method for configuring a computing system comprising an array of resistive processing unit cells to perform a backward pass operation, according to an exemplary embodiment of the disclosure. In particular, FIG. 3B schematically illustrates a configuration of the computing system 300 when performing a backward pass operation, wherein multiplexers in the peripheral circuitry of the computing system 300 are activated to selectively connect column line driver circuitry 340 to the column lines C1, C2, . . . , Cn, and to connect the shared readout circuitry 330 to the row lines R1, R2, . . . , Rm. The column line driver circuitry 340 comprises a plurality of DAC circuit blocks 342-1, 342-2, . . . , 342-n (collectively DAC circuit blocks 342) which are connected to respective column lines C1, C2, . . . , Cn.

In some embodiments, as noted above, the rows and columns do not share the DAC circuitry such that each row and column has a dedicated DAC circuit block, as illustrated in FIGS. 3A and 3B. On the other hand, in some embodiments, the rows and columns share the readout circuitry 330 (e.g., row R1 and column C1 share the readout circuit block 330-1, row R2 and column R2 share the readout circuit block 330-2, etc.). In some embodiments, where the number of rows and the number of columns is the same (i.e., n=m), the number of readout circuit blocks of the shared readout circuitry 330 will be equal to n=m. On the other hand, when the number of row and columns is not the same (i.e., n≠m), the number of readout circuit blocks of the readout circuitry 330 will be equal to the greater of n and m.

As shown in FIG. 3B, the backward pass operation performed on the array of RPU cells 305 of the computing system 300 is performed in a manner that is similar to the forward pass operation (FIG. 3A) except that the computing system 300 receives a vector of error signals δ=[$δ_1, δ_2, \ldots, δ_n$] which is backpropagated from a downstream layer of the neural network. The digital error signals $δ_1, δ_2, δ_n$ are input to the respective DAC circuit blocks 342-1, 342-2, . . . , 342-n which are connected to the respective columns C1, C2, . . . , Cn. The DAC circuit blocks 342-1, 342-2, . . . , 342-n generate analog voltages $V_1, V_2, \ldots, V_n$ using the same or similar time-encoding techniques as discussed above to generate pulse-modulated voltage pulses (with a same amplitude but tunable pulse width) which correspond to the values of the respective digital error signals $δ_1, δ_2, \ldots, δ_n$. As explained in further detail below, in some embodiments, for the backward pass operation, the analog voltage signals $V_1, V_2, \ldots, V_n$ are generated based on an integration time $T2_{meas}$ which is greater than the integration time $T1_{meas}$ that is utilized for the forward pass operation.

During the backward pass operation, the analog voltage signals $V_1, V_2, \ldots, V_n$ (e.g., read pulses which represent the error signals), are applied to the column lines C1, C2, . . . , Cn, wherein each RPU cell 310 generates a corresponding read current $I_{READ}=V_j \times G_{ij}$ (based on Ohm's law) wherein $V_j$ denotes the analog input voltage applied to the given RPU cell 310 on the given column j and wherein Gij denotes the conductance value of the given RPU cell 310 (at the given row i and column j). As shown in FIG. 3B, the read currents that are generated by the RPU cells 310 on each row i are summed together (based on Kirchhoff's current law) to generate respective row currents $I_1, I_2, \ldots, I_m$ at the output of the respective rows R1, R2, ..., Rm. In this manner, the row currents $I_1, I_2, \ldots, I_m$ represent the result of a matrix-vector multiplication operation that is performed in the backward pass operation, wherein the conductance matrix G (with conductance values Gij) is multiplied by the input voltage vector $[V_1, V_2, \ldots, V_n]$ to generate an output current vector $[I_1, I_2, \ldots, I_m]$, as illustrated in FIG. 3B. In particular, a given row current $I_i$ is computed as $I_i = \Sigma_{j=1}^{n} V_j G_{ij}$. For example, the column current $I_1$ for the first row R1 is determined as $I_1 = (V_1 G_{11} + V_2 G_{12} +, \ldots, +V_n G_{1n})$.

The resulting aggregate read currents $I_1, I_2, \ldots, I_m$ at the output of the respective rows R1, R2, ..., Rm are input to the respective readout circuit blocks 330-1, 330-2, ..., 330-m of the shared readout circuitry 330. The aggregate read currents $I_1, I_2, \ldots, I_m$ are integrated by the respective current integrator circuits 332-1, 332-2, ..., 332-m to generate respective output voltages, which are quantized by the respective ADC circuits 334-1, 334-2, ..., 334-m to generate respective digital output signals $z_1, z_2, \ldots, z_n$ of an output vector z. The digital output signals $z_1, z_2, \ldots, z_n$ are then processed and transmitted to the next upstream layer to continue the backward propagation operation. This process continues until the error signals reach the input layer.

After the backward pass operation is completed on the array of RPU cells 305 of the computing system 300, a weight update process is performed to tune conductance values of the RPU cells 310 (which represent the conductance matrix G of the array of RPU cells 305) based on the forward-propagated digital signals $x_1, x_2, \ldots, x_m$ and the backward-propagated digital error signals $\delta_1, \delta_2, \ldots, \delta_n$, that were received by the array of RPU cells 305 during the forward and backward pass operations. Once the error signal values (or delta values) have been integrated for a given neuron layer, that layer is ready for weight update. The update process that is performed on the array of RPU cells 305 of the computing system 300 can be pipelined with the backward propagation of the error vector δ through additional upstream layers of the computing system 300. In some embodiments, the backward propagation from the first hidden layer back to the input layer neurons is performed, but not required as the input neurons have no upstream synapses, so the highest layer that uses the δ error values is a first hidden layer.

As further illustrated in FIGS. 3A and 3B, a mode control system 350 is configured to generate control signals that dynamically change the configuration (e.g., hardware configuration) of the shared readout circuitry 330 to have different output signal bounds for different operations, e.g., forward pass and backward pass operations, performed on array of RPU cells 305 of the computing system 300. For instance, as shown in FIG. 3A, the mode control system 350 generates one or more control signals to dynamically configure the shared readout circuitry 330 to have a first configuration, CONFIG_1, which is optimized for the forward pass operation. In particular, in the forward pass operation, the shared readout circuitry 330 is configured to operate with a first output signal bound b1 (e.g., a first operating signal range) which is determined based on the anticipated range (e.g., signal strength) of the voltage signals and current signals that are received and generated by the array of RPU cells 305 and the row line driver circuitry 320 and readout circuitry 330 during the forward pass operations.

Furthermore, as shown in FIG. 3B, the mode control system 350 generates one or more control signals to dynamically configure the shared readout circuitry 330 to have a second configuration, CONFIG_2, which is optimized for the backward pass operation. In particular, in the backward pass operation, the shared readout circuitry 330 is configured to operate with a second output signal bound b2 (e.g., a second operating signal range) which is determined based on the anticipated signal strength range of the voltage signals and current signals that are received and generated by the array of RPU cells 305 and the column line driver circuitry 340 and the readout circuitry 330 during the backward pass operations. As noted above, in the backward pass operation, the error signals δ can have low signal strengths (e.g., δ<<1), wherein output signal bound b1 (e.g., a first operating signal range) of the shared readout circuitry 330 for the forward pass operation is insufficient to adequately process and quantize the aggregate current signals that are output from array of RPU cells 305 as during a backward pass operation. As explained in further detail below, various techniques can be implemented to dynamically configure the peripheral circuitry (e.g., the shared readout circuitry 330) to have a second operating signal range to enhance the signal processing and quantization of the aggregate current signals that are output from the RPU cells 310 of the array of RPU cells 305 during the backward pass operation.

It is to be understood that the mode control system 350 shown in FIGS. 3A and 3B (as well as exemplary mode control systems shown in FIGS. 6, 7A, 7B, 8, and 9A) generically represents a control system which, in some embodiments, collectively includes various types of control circuitry, processors, and associated functionalities (implemented in software, firmware, and/or hardware) to control the peripheral circuitry of a neural core (e.g., peripheral circuitry 120 and 130 of the computing system 100 (FIG. 1), the row line driver circuitry 320, the shared readout circuitry 330, and the column line driver circuitry 340 of the computing system 300, etc.) to thereby control various operations (e.g., forward, backward, and update operations) that are performed by the computing system. For example, the mode control system 350 includes the control signal circuitry 140 (FIG. 1) as well as control circuitry, processors, etc., of one or more digital processing cores that are operatively coupled to the neural cores, wherein the one or more digital processing cores provide data and control signals to direct operations performed by the neural cores.

Figure 5A:
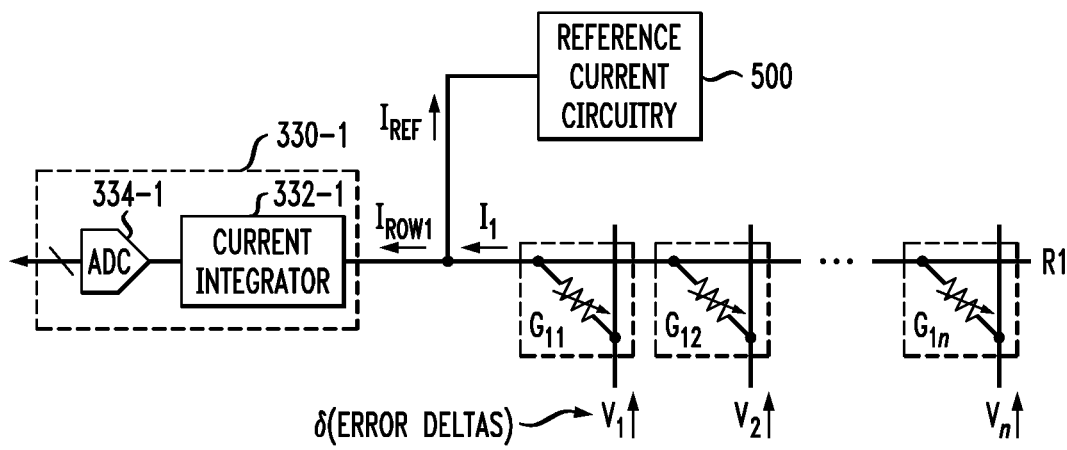
FIGS. 5A and 5B schematically illustrate methods for configuring a computing system comprising an array of resistive processing unit cells to perform a backward pass operation using signed weight values, according to exemplary embodiments of the disclosure.
Figure 5B:
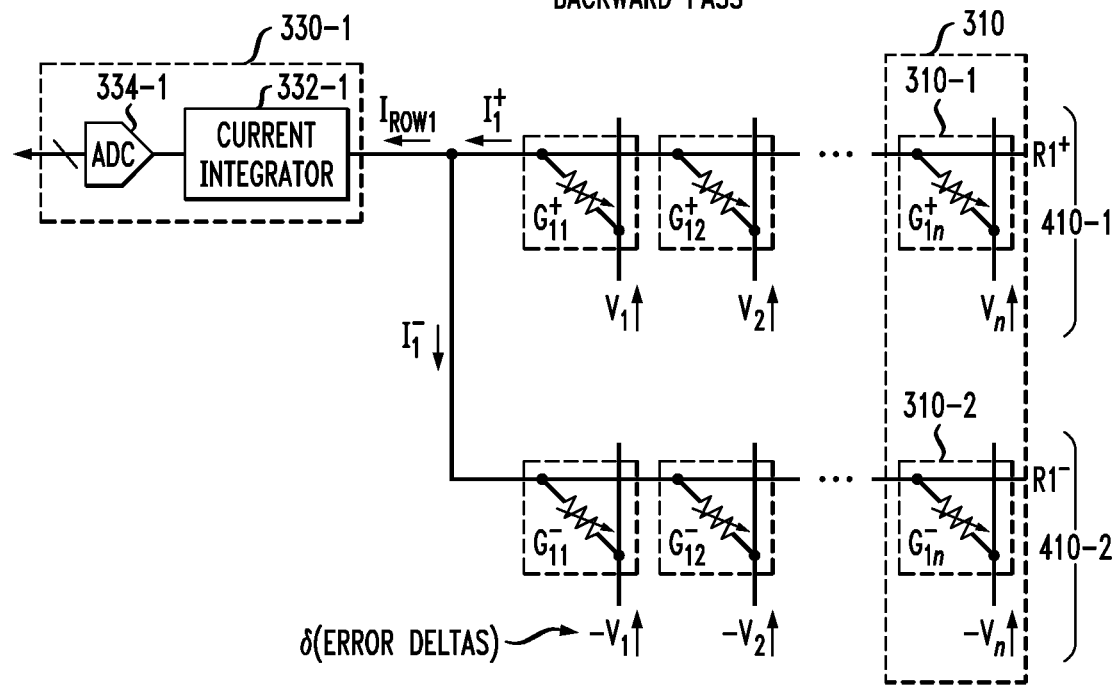

While FIGS. 3A and 3B schematically illustrate exemplary methods for generating the aggregate column and row currents during forward and backward pass operations, other techniques can be implemented to generate the aggregate column and row currents using differential current techniques that allow for "signed weights." For example, FIGS. 4A and 4B schematically illustrate methods for configuring a computing system comprising an array of resistive processing unit cells to perform a forward pass operation using signed weight values, according to exemplary embodiments of the disclosure. In addition, FIGS. 5A and 5B schematically illustrate methods for configuring a computing system comprising an array of resistive processing unit cells to perform a backward pass operation using signed weight values, according to exemplary embodiments of the disclosure.

More specifically, FIG. 4A schematically illustrates a method for generating an aggregate column current during a forward pass operation using a reference current ($I_{REF}$) that is generated by a reference current circuit 400 to enable "signed weights." For ease of illustration, FIG. 4A shows only the first column C1 and the associated readout circuit block 330-1 of the shared readout circuitry 330. FIG. 4A schematically illustrates a differential read scheme in which an aggregate column current $I_{COL1}$ that is input to the readout circuit block 330-1 is determined as $I_{COL1}=I_1-I_{REF}$. With this differential scheme, the magnitude of $I_{COL1}$ will indicate a weight value, and the weight sign will depend on the whether $I_1$ is greater than, equal to, or less than, the reference current $I_{REF}$. A positive sign ($I_{COL1}>0$) will be obtained when $I_1>I_{REF}$. A zero value ($I_{COL1}=0$) will be obtained when $I_1=I_{REF}$. A negative sign ($I_{COL1}<0$) will be obtained when $I_1<I_{REF}$. While the reference current circuitry 400 is generically illustrated in FIG. 4A, the reference current circuitry 400 can be implemented using known techniques. For example, in some embodiments, the reference current circuitry 400 comprises fixed current source that is configured to generate a reference current IREF with a known fixed magnitude which is selected for the given application.

Next, FIG. 4B schematically illustrates a method for generating an aggregate column current $I_{COL1}$ during a forward pass operation using different column currents $I_1^+$ and $I_1^-$ from corresponding columns $C1^+$ and $C1^-$ of two separate RPU arrays 410-1 and 410-2, wherein the conductance is determined as ($G^+-G^-$). More specifically, in the exemplary embodiment of FIG. 4B, each RPU cell 310 (artificial synapse) comprises two unit RPU cells 310-1 and 310-2 which have respective conductance values $G_{ij}^+$ and $G_{ij}^-$, wherein the conductance value of a given RPU cell is determined as the difference between the respective conductance values, i.e., $G_{ij}=G_{ij}^+-G_{ij}^-$, where i and j are indices within the 2D array of synapses. In this way, negative and positive weights can be readily encoded using positive-only conductance values.

In other words, since the conductance values of RPU devices can only be positive, differential scheme in FIG. 4B implements a pair of identical RPU device arrays to encode positive ($w_{ij}^+$) and negative ($w_{ij}^-$) weight values, wherein the weight value (wij) is proportional to a difference of two conductance values stored in two corresponding devices ($G_{ij}^+-G_{ij}^-$) located in identical positions of a pair of RPU arrays 410-1 and 410-2 (wherein the two RPU arrays 410-1 and 410-2 can be stacked on top of each other in a back-end-of-line metallization structure of a chip). In this instance, a single RPU tile is deemed a pair of RPU arrays with the peripheral circuits that support the parallel operation of the array in all three cycles.

As shown in FIG. 4B, positive voltage pulses ($V_1$, $V_2$, ..., $V_n$ and corresponding negative voltage pulses ($-V_1$, $-V_2$, ..., $-V_n$ are supplied separately to the RPU cells 310-1 and 310-2 in corresponding rows in the identical RPU arrays 410-1 and 410-2 that are used to encode positive and negative weights. The aggregate column currents $I_1^+$ and $I_1^-$ that are output from the corresponding first columns $C1^+$ and $C1^-$ in the respective RPU arrays 410-1 and 410-1 are combined to generate a differential aggregate current $I_{COL1}$ which is input to the readout circuit block 330-1 connected to the corresponding first columns $C1^+$ and $C1^-$.

FIGS. 5A and 5B are similar to FIGS. 4A and 4B, but schematically illustrate alternate embodiments of generating the output currents on the rows during a backward pass operation. More specifically, FIG. 5A schematically illustrates a method for generating an aggregate row current during a backward pass operation using a reference current ($I_{REF}$) that is generated by a reference current circuit 500 to enable "signed weights." For ease of illustration, FIG. 5A shows only the first row R1 and the associated readout circuit block 330-1 of the shared readout circuitry 330. FIG. 5A schematically illustrates a differential read scheme in which an aggregate row current $I_{ROW1}$ that is input to the readout circuit block 330-1 is determined as $I_{ROW1}=I_1-I_{REF}$. With this differential scheme, the magnitude of $I_{ROW1}$ will indicate a weight value, and the weight sign will depend on the whether $I_1$ is greater than, equal to, or less than, the reference current $I_{REF}$. A positive sign ($I_{ROW1}>0$) will be obtained when $I_1>I_{REF}$. A zero value ($I_{ROW1}=0$) will be obtained when $I_1=I_{REF}$. A negative sign ($I_{ROW1}<0$) will be obtained when $I_1<I_{REF}$. While the reference current circuitry 500 is generically illustrated in FIG. 5A, the reference current circuitry 500 can be implemented using known techniques. For example, in some embodiments, the reference current circuitry 500 comprises fixed current source that is configured to generate a reference current IREF with a known fixed magnitude which is selected for the given application.

Next, FIG. 5B schematically illustrates a method for generating an aggregate row current $I_{ROW1}$ during a backward pass operation using differential row currents $I_1^+$ and $I_1^-$ from corresponding rows $R1^+$ and $R1^-$ of the two separate RPU arrays 410-1 and 410-2. Again, in the exemplary embodiment of FIG. 5B, each RPU cell 310 (artificial synapse) comprises two unit RPU cells 310-1 and 310-2 which have respective conductance values $G_{ij}^+$ and $G_{ij}^-$, wherein the conductance value of a given RPU cell 310 is determined as the difference between the respective conductance values, i.e., $G_{ij}=G_{ij}^+-G_{ij}^-$ where i and j are indices within the respective RPU arrays 410-1 and 410-2. In this way, negative and positive weights can be readily encoded using positive-only conductance values.

As shown in FIG. 5B, positive voltage pulses ($V_1$, $V_2$, ..., $V_n$ and corresponding negative voltage pulses $V_1$, $-V_2$, ..., $-V_n$ are applied separately to the RPU cells 310-1 and 310-2 in corresponding columns in the identical RPU arrays 510-1 and 510-2 that are used to encode positive and negative weights. The aggregate row currents $I_1^+$ and $I_1^-$ that are output from the corresponding first rows $R1^+$ and $R1^-$ in the respective RPU arrays 410-1 and 410-2 are combined to generate a differential aggregate current $I_{COL1}$ which is input to the readout circuit block 330-1 connected to the corresponding first columns $C1^+$ and C1.

Exemplary embodiments will now be discussed in further detail in conjunction with FIGS. 6, 7A, 7B, 8, 9A, and 9B which schematically illustrate bound management techniques that are implemented the analog domain to dynamically change the configuration (e.g., hardware configuration) of the shared readout circuitry to provide different signal bounds for different operational modes, e.g., forward pass and backward pass operations, of an analog RPU crossbar array. In particular, FIGS. 6, 7A, 7B, 8, 9A, and 9B schematically illustrate various techniques to dynamically configure the peripheral circuitry (e.g., the shared readout circuitry 330) to have specialized configurations (e.g., asymmetric hardware configurations) for the different operating modes (e.g., forward and backward pass operations) to thereby optimize the signal processing and quantization of the aggregate current signals that are output from the rows and columns of the analog RPU crossbar array for the different operating modes. This is in contrast to conventional schemes in which the peripheral circuitry of the analog RPU crossbar array has a "symmetric" configuration" to perform the readout operations for the for the backward and forward pass operations.

FIG. 6 schematically illustrates a system to dynamically configure readout circuitry for different operations performed on an array of resistive processing unit cells, according to an exemplary embodiment of the disclosure. More specifically, FIG. 6 schematically illustrates a system 600 for dynamically configuring integration capacitors of current integrator circuits to change the gain of the current integrator circuits depending on the operation mode (e.g., forward pass operation or backward pass operation) of the analog RPU crossbar array. The system 600 comprises a mode control system 610 and a readout circuit block 620. The mode control system 610 is configured to generate various control signals 612 that are applied to all readout circuit blocks of the shared readout circuitry (e.g., shared readout circuitry 330, FIGS. 3A and 3B) which are utilized during forward and backward pass operations. In an exemplary embodiment, the control signals 612 include control signals denoted as F_Mode, B_Mode, CAP_Select, and $\overline{\text{CAP\_Select}}$.

For ease of illustration, FIG. 6 schematically depicts a given readout circuit block 620 which represents the $i^{th}$ readout circuit block of the plurality of readout circuit blocks of the shared readout circuitry 330. In the exemplary embodiment of FIG. 6, it is assumed that each readout circuit block of the shared readout circuitry 330 has the same circuit configuration as the readout circuit block 620 and that each readout circuit block of the shared readout circuitry 330 receives the control signals 612 which are output from the mode control system 610 during forward and backward pass operations performed on the associated analog RPU crossbar array.

As schematically illustrated in FIG. 6, the readout circuit block 620 comprises a multiplexer circuit 630, a current integrator circuit 640, and an ADC circuit 650. The current integrator circuit 640 comprises an operational amplifier 642, a first integrating capacitor 644-1, a second integrating capacitor 644-2, a first switch 646-1, and a second switch 646-2. The operational amplifier 642 comprises a non-inverting input connected to ground (GND) voltage, an inverting input (denoted node N1) connected to an output of the multiplexer circuit 630, and an output (denoted node N2) connected to an input of the ADC circuit 650. The first integrating capacitor 644-1 and the first switch 646-1 are serially connected between the nodes N1 and N2, and the second integrating capacitor 644-2 and the second switch 646-2 are serially connected between the nodes N1 and N2.

As further shown in FIG. 6, the multiplexer circuit 630 has first and second inputs connected to a corresponding row line ROW(i) and column line COL(i) of the RPU crossbar array. The multiplexer circuit 630 comprises control inputs that receive the control signals F_Mode, B_Mode. The control signal F_Mode comprises control signal that is output from the mode control system 610 when the RPU crossbar array is performing a forward pass operation, and the control signal B_Mode comprises control signal that is output from the mode control system 610 when the RPU crossbar array is performing a backward pass operation. In some embodiments, the multiplexer circuit 630 is configured to (i) connect the row line ROW(i) to the input node N1 of the current integrator circuit 640 in response to an assertion of the B_Mode control signal, and (ii) connect the column line COL(i) to the input node N1 of the current integrator circuit 640 in response to an assertion of the F_Mode control signal.

In this configuration, the multiplexer circuit 630 is configured to control the sharing of the readout circuit block 620 for forward and backward pass operations performed by the RPU crossbar array. For example, in the exemplary embodiment of FIGS. 3A and 3B, the multiplexer circuit 630 and associated control signals F_Mode and B_Mode (implemented in each of the readout circuit blocks of the shared readout circuitry 330) provides a mechanism for selectively connecting the column lines C1, C2, . . . , Cn of the RPU array 305 to the shared readout circuitry 330 during a forward pass operation (FIG. 3A), and selectively connecting the row lines column lines R1, R2, . . . , Rm of the array of RPU cells 305 to the shared readout circuitry 330 during a backward pass operation (FIG. 3A).

The current integrator circuit 640 performs an integration function over an integration period (Tmeas) to convert an input current at the input node N1 of the current integrator circuit 640 to an analog voltage $V_{OUT}$ at the output node N2 of the current integrator circuit 640. At the end of the integration period, the ADC circuit 650 latches in the output voltage $V_{OUT}$, and quantizes the output voltage $V_{OUT}$ to generate a digital signal which corresponds to the analog output voltage $V_{OUT}$. The input current can be (i) an aggregate column current which is output from the column line COL(i) that is selectively connected (via operation of the multiplexer circuit 630) to the input node N1 of the current integrator circuit 640 during a forward pass operation or (ii) an aggregate row current which is output from the row line ROW (i) that is selectively connected (via operation of the multiplexer circuit 630) to the input node N1 of the current integrator circuit 640 during a backward pass operation.

The current integrator circuit 640 is configured as an operational transconductance amplifier (OTA) with a selectable capacitive feedback provided by one of the first and second integrating capacitors 644-1 and 644-2 to convert the input current (aggregate row current or aggregate column current) to an output voltage $V_{OUT}$ on output node N2 of the current integrator circuit 640. In the exemplary configuration of FIG. 6, the first integrating capacitor 644-1 comprise a capacitance value $C_{INT}1$ and the second integrating capacitor 644-2 comprises a capacitance value $C_{INT}2$, wherein $C_{INT}1$ is greater than $C_{INT}2$. The first and second integrating capacitors 644-1 and 644-2 are selectively connected in the feedback path of the operational amplifier 642 for different operating modes (e.g., forward and backward pass operations) to change the amount of feedback capacitance and, thus, change the gain of the current integrator circuit 640 depending on the current operating mode.

The first and second switches 646-1 and 646-2 are controlled by the respective control signals CAP_Select and $\overline{\text{CAP\_Select}}$ which are output from the mode control system 610. In some embodiments, the first and second switches 646-1 and 646-2 are implemented using MOSFET switches (e.g., N-type MOSFET devices) with gate terminals that receive the respective control signals CAP_Select and $\overline{\text{CAP\_Select}}$. The control signals CAP_Select and $\overline{\text{CAP\_Select}}$ are complementary signals such that when the control signal CAP_Select is asserted to logic "1", the complementary control signal $\overline{\text{CAP\_Select}}$ will be logic "0", and when the control signal CAP_Select is asserted to logic "0", the complementary control signal CAP_Select will be logic "1".

In this configuration, when the control signal CAP_Select is asserted to logic "1", the first switch 646-1 is activated (closed) and the first integrating capacitor 644-1 is selectively connected in the feedback path between the input node N1 and output node N2 of the operational amplifier 642. In this instance, the complementary control signal $\overline{\text{CAP\_Select}}$ will be logic "0" such that the second switch 646-2 is deactivated (open) and the second integrating 644-2 is disconnected from the feedback path between the input node N1 and output node N2 of the operational amplifier 642. In this configuration, the operational amplifier 642 will have a first gain which is based on the value $C_{INT}1$ of the first integrating capacitor 644-1. On the other hand, when the control signal CAP_Select is asserted to logic "0", the first switch 646-1 is deactivated (open) and the first integration capacitor 644-1 is disconnected from the feedback path between the input node N1 and the output node N2 of the operational amplifier 642. In this instance, the complementary control signal $\overline{\text{CAP\_Select}}$ will be logic "1" such that the second switch 646-2 is activated (closed) and the second integrating capacitor 644-2 is selectively connected in the feedback path between the input node N1 and the output node N2 of the operational amplifier 642. In this configuration, the operational amplifier 642 will have a second gain which is based on the value $C_{INT}2$ of the second integrating capacitor 644-2, wherein the second gain is greater than the first gain.

In the exemplary embodiment of FIG. 6, the current integrator circuit 640 has a configurable gain which can dynamically switched between a high gain configuration and a low gain configuration by selectively connecting one of the first and second current integrating capacitors 644-1 and 644-2 in the capacitive feedback path of the operational amplifier 642. For example, during a forward pass operation, the current integrator circuit 640 can be configured to have a low gain configuration to generate the output voltage $V_{OUT}$ on the output node N2, and during a backward pass operation, the current integrator circuit 640 can be configured to have a high gain configuration to generate the output voltage $V_{OUT}$ on the output node N2.

In general, the output voltage $V_{OUT}$ generated by the current integrator circuit 640 is determined as:

$$V_{OUT} = -\frac{1}{R \times C_{INT}} \int_0^{T_{MEAS}} V_{IN} \cdot dt,$$

wherein R denotes the respective resistance values (or conductance values) of the RPU cells that contribute to the aggregate current (row current or column) current at the input node N1 of the current integrator circuit 640, wherein $C_{INT}$ denotes the capacitance value of the integrating capacitor selectively connected in the feedback path between the input and output nodes N1 and N2 of the operational amplifier 642, wherein $V_{IN}$ denotes the respective input voltage pulses that contribute to the generation of the aggregated row or column current, and wherein $T_{MEAS}$ denotes the integration time. As shown, the magnitude of the output voltage $V_{OUT}$ is indirectly proportional to the capacitance value $C_{INT}$ of the integrating capacitor. As such, for given values of R, $T_{MEAS}$, and $V_{IN}$, the output voltage $V_{OUT}$ increases as the capacitance $C_{INT}$ of the feedback integrating capacitor decreases.

In an exemplary embodiment of the system configuration shown in FIG. 6, the capacitance value $C_{INT}1$ of the first integrating capacitor 644-1 is greater than the capacitance value $C_{INT}2$ of the second integrating capacitor 644-2. In this instance, during a forward pass operation, the first integrating capacitor 644-1 is selectively connected in the feedback path between the input and output nodes N1 and N2 of the operational amplifier 642, to configure the current integrator circuit 640 to have a low gain configuration. On the other hand, during a backward pass operation, given that the pulse widths of the input voltages are expected to be significantly shorter in duration than the pulse widths of the input voltages for the forward pass operation, the second integrating capacitor 644-2 is selectively connected in the feedback path between the input and output nodes N1 and N2 of the operational amplifier 642, to configure the current integrator circuit 640 to have a high gain configuration and, thereby, generate output voltages $V_{OUT}$ with sufficient magnitude for processing by the ADC circuit 650. The capacitance values $C_{INT}1$ and $C_{INT}2$ of the first and second integrating capacitors 644-1 and 644-1 are selected to provide sufficient gain during the forward and backward pass operations while preventing or otherwise minimizing the possibility of saturating the operational amplifier 642 during the current integration operations.

Figure 7A:
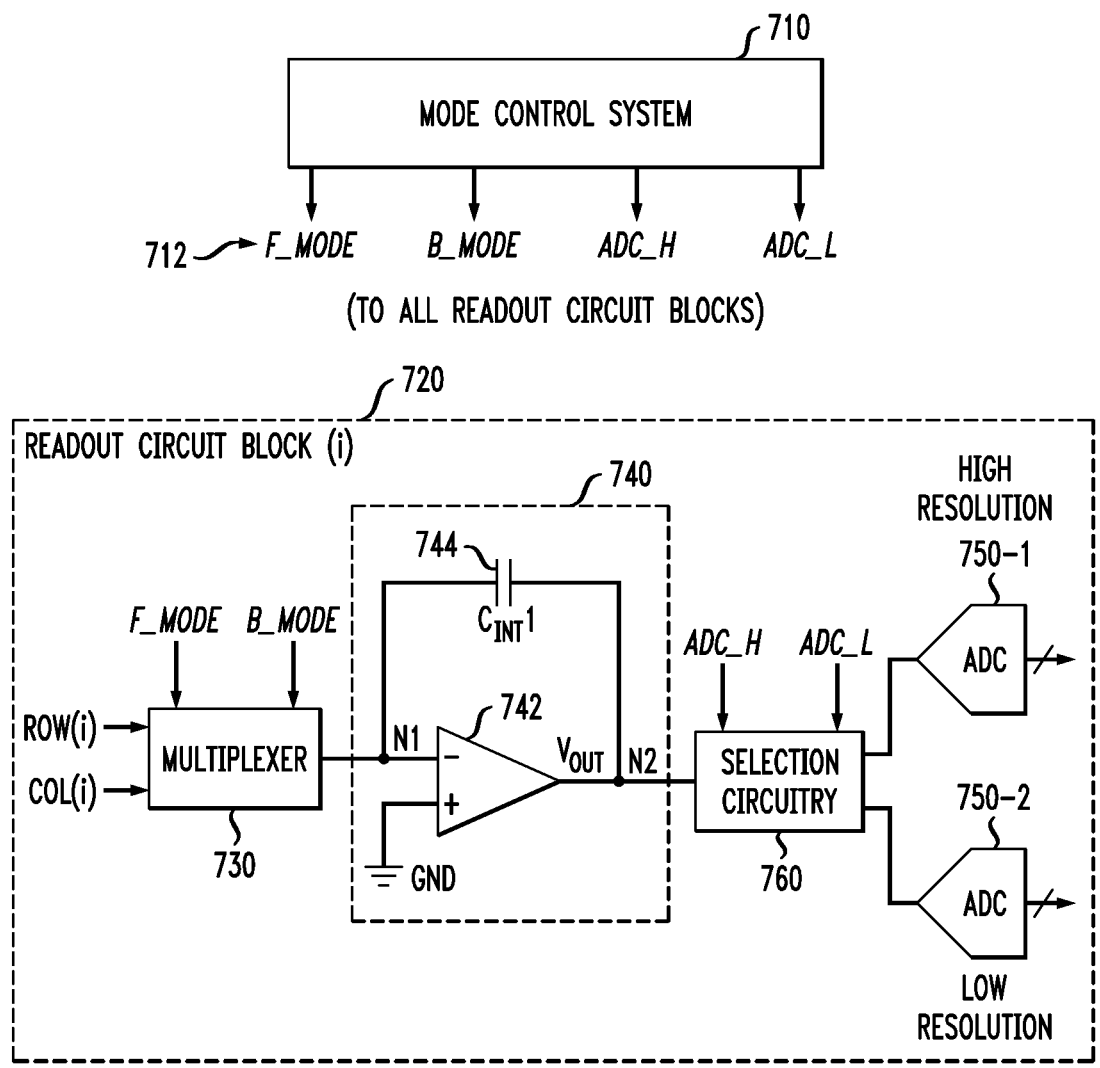
FIG. 7A schematically illustrates a system to dynamically configure readout circuitry for different operations performed on an array of resistive processing unit cells, according to another exemplary embodiment of the disclosure.

FIGS. 7A and 7B schematically illustrate systems to dynamically configure readout circuitry for different operations performed on an array of resistive processing unit cells, according to exemplary embodiments of the disclosure. More specifically, FIGS. 7A and 7B schematically illustrate alternate exemplary embodiments of systems for dynamically configuring the shared readout circuitry to select between two different ADC circuits which have different resolutions depending on the operating mode (forward pass or backward pass) of the RPU crossbar array. Referring to FIG. 7A, system 700 comprises a mode control system 710 and a readout circuit block 720. The mode control system 710 is configured to generate various control signals 712 that are applied to all readout circuit blocks of the shared readout circuitry (e.g., shared readout circuitry 330, FIGS. 3A and 3B) which are utilized during forward and backward pass operations. In an exemplary embodiment, the control signals 712 include control signals denoted as F_Mode, B_Mode, ADC_H, and ADC_L.

For ease of illustration, FIG. 7A schematically depicts a given readout circuit block 720 which represents the $i^{th}$ readout circuit block of the plurality of readout circuit blocks of the shared readout circuitry 330. In the exemplary embodiment of FIG. 7A, it is assumed that each readout circuit block of the shared readout circuitry 330 has the same circuit configuration as the readout circuit block 720 and that each readout circuit block of the shared readout circuitry 330 receives the control signals 712 which are output from the mode control system 710 during forward and backward pass operations performed on the associated analog RPU crossbar array.

As schematically illustrated in FIG. 7A, the readout circuit block 720 comprises a multiplexer circuit 730, a current integrator circuit 740, a selection circuitry 760, a first ADC circuit 750-1 and a second ADC circuit 750-2. The current integrator circuit 740 comprises an operational amplifier 742 and an integrating capacitor 744 which is connected between input and output nodes Nl and N2 of the operational amplifier 742. The multiplexer circuit 730 comprises control inputs which receive the control signals F_Mode and B_Mode. The multiplexer circuit 730 is configured to operate in the same manner as the multiplexer circuit 630 of FIG. 6, the details of which will not be repeated.

The current integrator circuit 740 performs integration function over an integration period ($T_{MEAS}$) to convert an input current at the input node N1 of the current integrator circuit 740 to an analog voltage $V_{OUT}$ at the output node N2 of the current integrator circuit 740. The input current can be (i) an aggregate column current which is output from the column line COL (i) that is selectively connected (via operation of the multiplexer circuit 730) to the input node N1 of the current integrator circuit 740 during a forward pass operation or (ii) an aggregate row current which is output from the row line ROW (i) that is selectively connected (via operation of the multiplexer circuit 730) to the input node N1 of the current integrator circuit 740 during a backward pass operation. In the exemplary embodiment of FIG. 7A, the current integrator circuit 740 has a fixed gain that is based on a capacitance value $C_{INT}1$ of the integrating capacitor 744. In some embodiments, the capacitance value $C_{INT}1$ of the integrating capacitor 744 is selected for the output signal bound for forward pass operations, e.g., provide sufficient gain for the current integrator circuit 740 to generate output voltages $V_{OUT}$ on the output node N2 during forward pass operations while preventing or otherwise minimizing the possibility of saturating the operational amplifier 742 during the current integration operations.

As further shown in FIG. 7A, the selection circuitry 760 comprises (i) an input connected to the output node N2 of the current integrator circuit 740, (ii) control inputs that receive the control signals ADC_H and ADC_L, and (iii) first and second outputs which are connected to inputs of the first and second ADC circuits 750-1 and 750-2, respectively. In some embodiments, the first ADC circuit 750-1 comprises a high resolution ADC circuit which is utilized during backward pass operations to digitize the output voltages $V_{OUT}$ generated at the output node N2 of the current integrator circuit 740, and the second ADC circuit 750-2 comprises a low resolution ADC circuit which is utilized during forward pass operations to digitize the output voltages $V_{OUT}$ generated at the output node N2 of the current integrator circuit 740.

The control signal ADC_L comprises control signal that is output from the mode control system 710 when the RPU crossbar array is performing a forward pass operation, and the control signal ADC_H comprises control signal that is output from the mode control system 710 when the RPU crossbar array is performing a backward pass operation. In some embodiments, selection circuitry 760 is configured to (i) selectively connect the output node N2 of the current integrator circuit 740 to the input of the first ADC circuit 750-1 in response to an assertion of the control signal ADC_H, and (ii) selectively connect the output node N2 of the current integrator circuit 740 to the input of the second ADC circuit 750-2 in response to an assertion of the control signal ADC_L.

In some embodiments, the first ADC circuit 750-1 comprises a first resolution and the second ADC circuit 750-2 comprises a second resolution, wherein the first resolution is higher than the second resolution. In some embodiments, the first and second ADC circuits 750-1 and 750-2 comprise the same bit resolution wherein the first and second ADC circuits 750-1 and 750-2 each comprise an n-bit ADC resolution where, e.g., n=3, 4, 5, 6, 7, 8, but where the first and second ADC circuits 750-1 and 750-2 are configured to have different least significant bit (LSB) voltage resolutions for the given n-bit resolution.

For example, assume that the first and second ADC circuits 750-1 and 750-2 are 8-bit resolution ADCs, but where the first ADC circuit 750-1 is configured to have a full-scale operating voltage range of, e.g., [−0.1V to +0.1V], and the second ADC circuit 750-2 is configured to have a full-scale operating voltage range of, e.g., [−10V to +10V] (where V can be microvolts (µV), millivolts (mV), etc.). In this instance, the voltage resolution (first resolution) of the first ADC circuit 750-1 (8-bit ADC) would be 0.2/256, which is approximately 0.000078V, while the voltage resolution (second resolution) of the second ADC circuit 750-2 (8-bit ADC) would be 20/256, which is approximately 0.078V. In the example, the first voltage resolution (0.000078V) of the first ADC circuit 750-1 provides a higher voltage resolution than the second voltage resolution (0.078V) of the second ADC circuit 750-2 (8-bit ADC). The enhanced voltage resolution of the first ADC circuit 750-1 would be more effective to digitize the lower level output voltages $V_{OUT}$ generated at the output node N2 of the current integrator circuit 740 during backward pass operations, while the voltage resolution of the second ADC circuit 750-2 would be effective to digitize the higher level output voltages $V_{OUT}$ generated at the output node N2 of the current integrator circuit 740 during forward pass operations.

In other embodiments, the first and second ADC circuits 750-1 and 750-2 can be configured to have different gains, wherein a first gain of the first ADC circuit 750-1 is greater than a second gain of the second ADC circuit 750-2. For example, in some embodiments, the first and second ADC circuits 750-1 and 750-2 can be configured to have ADC conversion circuitry with the same bit resolution, same voltage resolution, and same operating voltage input range designed for the expected voltage range of the output voltages $V_{OUT}$ generated by forward pass operations, but where the first ADC circuit 750-1 comprises an analog front end comprising an amplifier and/or or level-shifting circuitry that is configured to provide a proper gain and level shifting of the low level output voltages $V_{OUT}$ (generated during backward pass operations) to match the operating input range of the ADC conversion circuitry.

Next, 7B schematically illustrates a system 701 for dynamically configuring the shared readout circuitry to select between two different ADC circuits which have different resolutions depending on the operating mode (forward pass or backward pass) of RPU crossbar array, according to an exemplary embodiment of the disclosure. As noted above, the system 701 of FIG. 7B is an alternate embodiment of the system 700 of FIG. 7A. Referring to FIG. 7B, the system 701 comprises a mode control system 711 and a readout circuit block 721. The mode control system 711 is configured to generate a plurality of control signals 713 that are applied to all readout circuit blocks of the shared readout circuitry (e.g., shared readout circuitry 330, FIGS. 3A and 3B) which are utilized during forward and backward pass operations. In an exemplary embodiment, the control signals 713 include the control signals denoted as F_Mode and B_Mode.

For ease of illustration, FIG. 7B schematically depicts a given readout circuit block 721 which represents the $i^{th}$ readout circuit block of the plurality of readout circuit blocks of the shared readout circuitry 330. In the exemplary embodiment of FIG. 7B, it is assumed that each readout circuit block of the shared readout circuitry 330 has the same circuit configuration as the readout circuit block 721 and that each readout circuit block of the shared readout circuitry 330 receives the control signals 713 which are output from the mode control system 711 during forward and backward pass operations performed on the associated analog RPU crossbar array.

As schematically illustrated in FIG. 7B, the readout circuit block 721 comprises selection circuitry 731, a first current integrator circuit 740-1, a second current integrator circuit 740-2, a first ADC circuit 750-1, and a second ADC circuit 750-2. The first current integrator circuit 740-1 has an input connected to an output of the selection circuitry 731, and an output connected to an input of the first ADC circuit 7501-1. The second current integrator circuit 740-2 has an input connected to an output of the selection circuitry 731, and an output connected to an input of the second ADC circuit 750-2. In some embodiments, the first and second current integrator circuits 740-1 and 740-2 are similar to the current integrator circuit 740 in FIG. 7A, the details of which will not be repeated. Further, in some embodiments, the first and second ADC circuits 750-1 and 750-2 implement the same circuit architectures and function as discussed above in the exemplary embodiment of FIG. 7B, the details of which will not be repeated.

The selection circuitry 731 is configured to operate in a manner similar to the multiplexer circuits 630 and 730 of FIGS. 7A and 7B. However, the selection circuitry 731 has two outputs, wherein in some embodiments, the selection circuitry 731 is configured to (i) selectively connect the row line ROW(i) to the input of the first current integrator circuit 740-1 in response to an assertion of the B_Mode control signal, and (ii) selectively connect the column line COL(i) to the input of the second current integrator circuit 740-2 in response to an assertion of the F_Mode control signal. In this configuration, the first current integrator circuit 740-1 and the first ADC circuit 750-1 will receive, integrate, and quantize an aggregate row current signal output from the row line ROW(i) during a backward pass operation, and the second current integrator circuit 740-2 and the second ADC circuit 750-2 will receive, integrate, and quantize an aggregate column current signal output from the column line COL(i) during a forward pass operation.

In an alternative embodiment of FIG. 7B, the first and second current integrator circuits 740-1 and 740-2 are configured to have different, but fixed gains, and the first and second ADC circuits 750-1 and 750-2 are configured to have the same resolution. In this embodiment, the first and second current integrator circuits 740-1 and 740-2 would each have a single integration capacitor, but with different sizes, in the respective feedback paths of the respective operational amplifiers, such that the first current integrator circuit 740-1 has a fixed first gain, and the second current integrator circuit 740-2 has a second fixed gain, which is less than the first fixed gain. With this configuration, the first current integrator circuit 740-1 would be designed with an output signal bound for backward pass operations by having a higher gain to generate output voltages $V_{OUT}$ with levels with voltage ranges that correspond to the operating input voltage range of the first ADC circuit 750-1.

Figure 8:
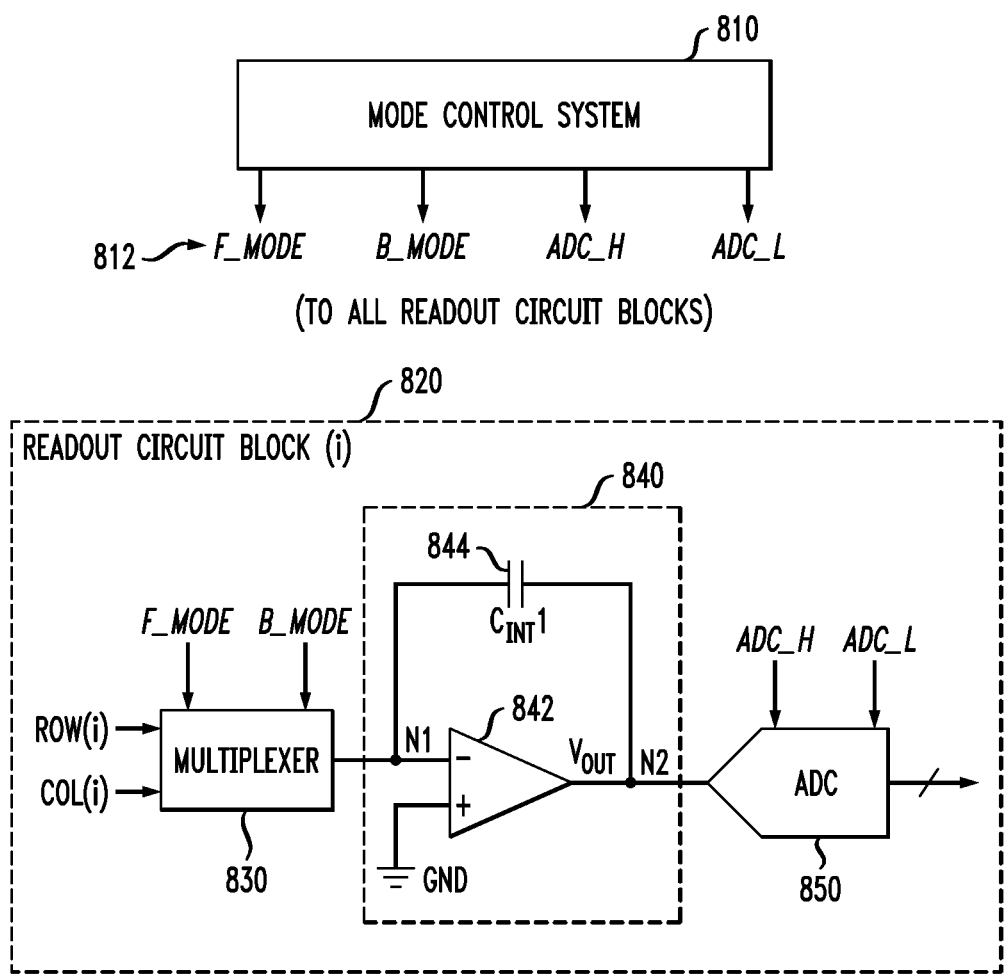
FIG. 8 schematically illustrates a system to dynamically configure readout circuitry for different operations performed on an array of resistive processing unit cells, according to another exemplary embodiment of the disclosure.

FIG. 8 schematically illustrates a system to dynamically configure readout circuitry for different operations performed on an array of resistive processing unit cells, according to another exemplary embodiment of the disclosure. More specifically, FIG. 8 schematically illustrates a system 800 for dynamically configuring an ADC circuit to have different resolutions or different gains depending on the operating mode (forward pass or backward pass) of RPU crossbar array. The system 800 comprises a mode control system 810 and a readout circuit block 820. The mode control system 810 is configured to generate various control signals 812 that are applied to all readout circuit blocks of the shared readout circuitry (e.g., shared readout circuitry 330, FIGS. 3A and 3B) which are utilized during forward and backward pass operations. In an exemplary embodiment, the control signals 812 include control signals denoted as F_Mode, B_Mode, ADC_H, and ADC_L.

Again, for ease of illustration, FIG. 8 schematically depicts a given readout circuit block 820 which represents the $i^{th}$ readout circuit block of the plurality of readout circuit blocks of the shared readout circuitry 330. In the exemplary embodiment of FIG. 8, it is assumed that each readout circuit block of the shared readout circuitry 330 has the same circuit configuration as the readout circuit block 820 and that each readout circuit block receives the control signals 812 which are output from the mode control system 810 when forward and backward pass operations are performed on the associated analog RPU crossbar array.

As schematically illustrated in FIG. 8, the readout circuit block 820 comprises a multiplexer circuit 830, a current integrator circuit 840, and a configurable ADC circuit 850. The current integrator circuit 840 comprises an operational amplifier 842 and an integrating capacitor 844 which is connected between input and output nodes N1 and N2 of the operational amplifier 842. The multiplexer circuit 830 and the current integrator circuit 840 comprise a same configuration and perform the same or similar functions as the multiplexer circuit 630 of FIG. 6 and the current integrator circuit 740 of FIG. 7A, the details of which will not be repeated. As further shown in FIG. 8, the configurable ADC circuit 850 comprises control inputs that receive the control signals ADC_H and ADC_L.

In some embodiments, the configurable ADC circuit 850 comprises a configurable LSB voltage resolution which is dynamically adjusted in response to the control signals ADC_H and ADC_L. For example, in response to an assertion of the control signal ADC_H during a backward pass operation, the configurable ADC circuit 850 is dynamically configured to increase the voltage resolution to a level which is sufficient to effectively quantize the low level output voltage $V_{OUT}$ that is generated on the output node N2 of the current integrator circuit 840 during a backward pass operation. Further, in response to an assertion of the control signal ADC_L during a forward pass operation, the configurable ADC circuit 850 is dynamically configured to decrease the voltage resolution to a level which is sufficient to effectively quantize the high level output voltage $V_{OUT}$ that is generated on the output node N2 of the current integrator circuit 840 during the forward pass operation. In this regard, the configurable ADC circuit 850 is dynamically configured to have a first resolution for a backward pass operation, and dynamically configured to have a second resolution for a forward pass operation, wherein the first resolution is greater than the second resolution.

The configurable ADC circuit 850 with a configurable ADC resolution can be implemented using suitable time-based ADC conversion circuits and techniques. For example, the configuration ADC circuit 850 can be implemented using a single-slope or dual-slope integration ADC architecture, wherein the ADC conversion is based on the integration of the output voltage $V_{OUT}$, a reference voltage, or the output voltage $V_{OUT}$ and a reference voltage. In this exemplary embodiment, the LSB voltage resolution can be dynamically modified by changing one or more operating parameters of the integrating ADC including, but not limited to, the level of the reference voltage, the integration time of the integration ADC, etc.

In other embodiments, the configurable ADC circuit 850 comprises a configurable gain which is dynamically adjusted in response to the control signals ADC_H and ADC_L. For example, the configurable ADC circuit 850 may have a fixed (non-configurable) resolution which is designed for the output signal bound for forward pass operations, but yet implement a programmable gain amplifier and level-shifting circuitry in an analog front end of the configurable ADC circuit 850 to dynamically adjust a gain of the programmable in amplifier depending on the operation mode (e.g., forward pass or backward pass operations).

For example, in some embodiments, in response to an assertion of the control signal ADC_H during a backward pass operation, the frontend analog circuitry of the configurable ADC circuit 850 is dynamically configured to have a higher gain to amplify the output voltage $V_{OUT}$ to a level which falls within the higher operating input voltage range of the conversion circuitry of the configurable ADC circuit 850, thereby allowing the low level output voltage $V_{OUT}$ to be more accurately quantized based on the fixed resolution of the configurable ADC circuit 850. Further, in response to an assertion of the control signal ADC_L during a forward pass operation, the frontend analog circuitry of the configurable ADC circuit 850 is dynamically configured to have a lower gain (e.g., unity gain of 1) so that the output voltage $V_{OUT}$ (which is latched into the configurable ADC circuit 850 from the output node of the current integrator circuit 840) is maintained at a level which falls within the operating input voltage range of the conversion circuitry of the configurable ADC circuit 850.

Figure 9A:
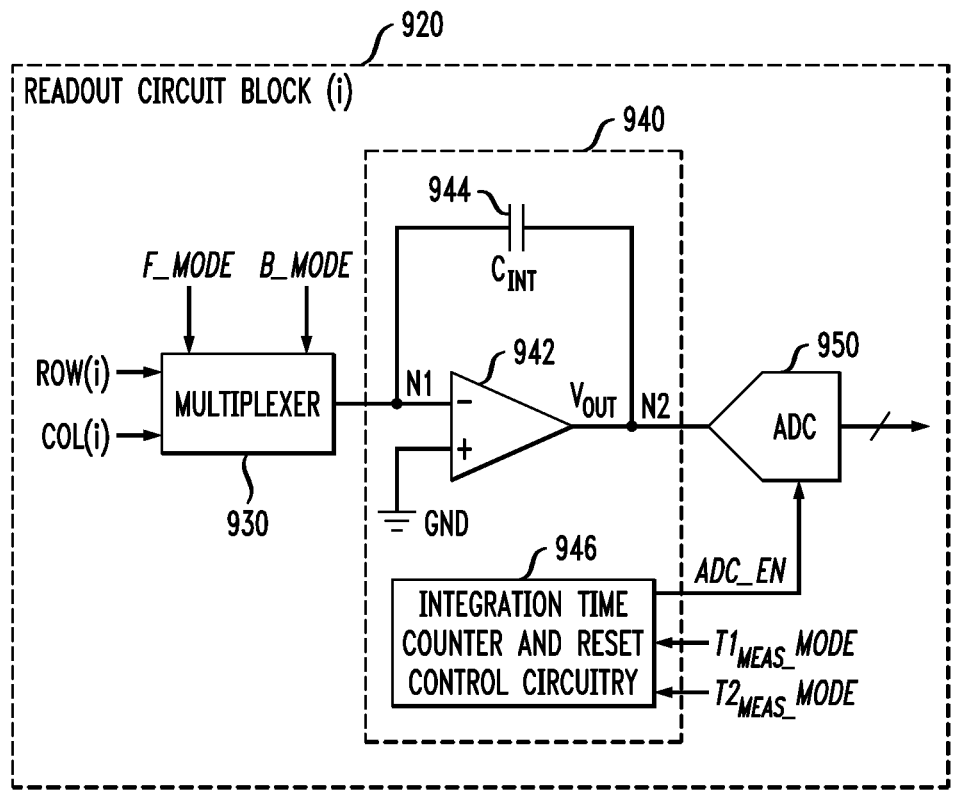
FIGS. 9A and 9B schematically illustrate a system to dynamically configure peripheral circuitry including readout circuitry for different operations performed on an array of resistive processing unit cells, according to another exemplary embodiment of the disclosure.
Figure 9B:
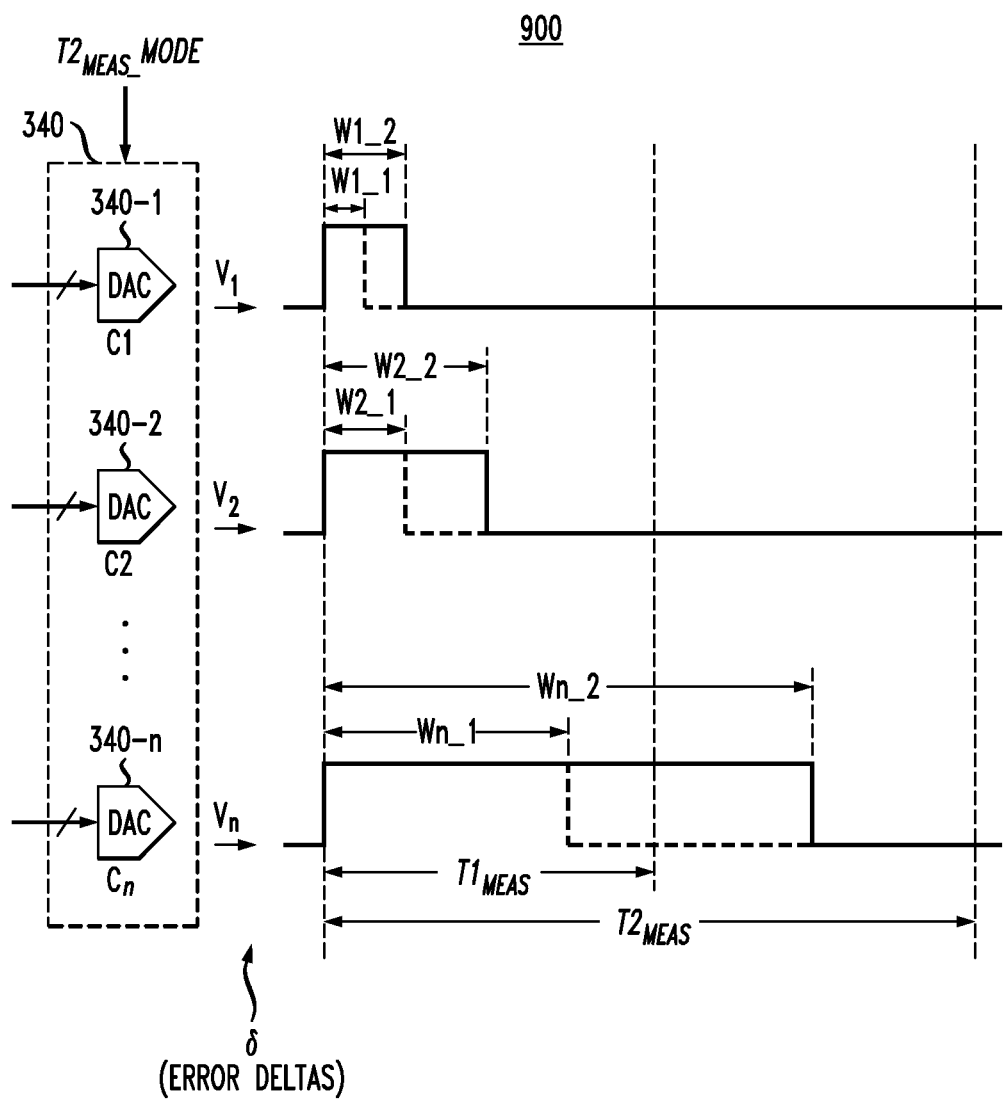

FIGS. 9A and 9B schematically illustrate a system to dynamically configure peripheral circuitry including readout circuitry for different operations performed on an array of resistive processing unit cells, according to another exemplary embodiment of the disclosure. More specifically, FIGS. 9A and 9B schematically illustrate a system to dynamically configure peripheral circuitry of an analog RPU crossbar array to have different operating signal ranges for different operational modes of the RPU crossbar array, according to another exemplary embodiment of the disclosure. FIGS. 9A and 9B schematically illustrate a system 900 to dynamically configure the peripheral circuitry (e.g., shared readout circuitry 330 and the column line driver circuitry 340 (DAC circuit blocks 342)) to provide different integration times depending on the operating mode (forward pass or backward pass) of RPU crossbar array.

Referring to FIG. 9A, the system 900 comprises a mode control system 910 and a readout circuit block 920. The mode control system 910 is configured to generate various control signals 912 that are applied to all readout circuit blocks of the shared readout circuitry (e.g., shared readout circuitry 330, FIGS. 3A and 3B) which are utilized during forward and backward pass operations. In an exemplary embodiment, the control signals 912 include control signals denoted as F_Mode, B_Mode, $T1_{MEAS}$_Mode, and $T2_{MEAS}$_Mode. Again, for ease of illustration, FIG. 9A schematically depicts a given readout circuit block 920 which represents the $i^{th}$ readout circuit block of the plurality of readout circuit blocks of the shared readout circuitry 330. In the exemplary embodiment of FIG. 9A, it is assumed that each readout circuit block of the shared readout circuitry 330 has the same circuit configuration as the readout circuit block 920 and that each readout circuit block receives the control signals 912 which are output from the mode control system 910 when forward and backward pass operations are performed on the associated analog RPU crossbar array.

As schematically illustrated in FIG. 9A, the readout circuit block 920 comprises a multiplexer circuit 930, a current integrator circuit 940, and an ADC circuit 950. In some embodiments, the multiplexer circuit 930 comprises a same configuration and performs the same or similar functions as the multiplexer circuit 630 of FIG. 6, the details of which will not be repeated. In addition, in some embodiments, the ADC circuit 950 comprises a same configuration and performs the same or similar functions as the ADC circuit 650 of FIG. 6, the details of which will not be repeated. In this exemplary embodiment, the ADC circuit 950 has a fixed configuration which is designed to have a resolution and operating signal range which effectively digitizes the anticipated higher level output voltages $V_{OUT}$ generated at the output node N2 of the current integrator circuit 940 during forward pass operations.

The current integrator circuit 940 comprises an operational amplifier 942, an integrating capacitor 944 which is connected between input and output nodes N1 and N2 of the operational amplifier 942, and control circuitry 946 including an integration time counter and reset control circuitry. The current integrator circuit 940 performs an integration function to convert an input current at the input node N1 of the current integrator circuit 940 to an analog voltage $V_{OUT}$ at the output node N2 of the current integrator circuit 940, wherein the current integration operation is performed over configurable integration period which can be dynamically adjusted to have a first integration time $T1_{MEAS}$ or a second integration time $T2_{MEAS}$ depending on an operating mode (e.g., forward pass or backward pass operation) of the RPU crossbar array. The second integration time $T2_{MEAS}$ is greater than the first integration time $T1_{MEAS}$. For example, in some embodiments first integration time $T1_{MEAS}$ is 80 nanoseconds (ns), while second integration time $T2_{MEAS}$ is greater than 80 ns (e.g., $T2_{MEAS}=2 \times T1_{MEAS}$).

In the exemplary embodiment of FIG. 9A, the current integrator circuit 940 has a fixed gain that is based on a capacitance value $C_{INT}1$ of the integrating capacitor 944. In some embodiments, the capacitance value $C_{INT}1$ of the integrating capacitor 944 is selected to provide the output signal bound for forward pass operations, e.g., provide sufficient gain for the current integrator circuit 940 to generate an output voltage $V_{OUT}$ on the output node N2 during forward pass operations for the integration period $T1_{MEAS}$ while preventing or otherwise minimizing the possibility of saturating the operational amplifier 942 during the current integration operations.

On the other hand, during a backward pass operation, the current integrator circuit 940 is dynamically configured to integrate the input current over the second integration period $T2_{MEAS}$ to enable a larger output voltage $V_{OUT}$ to be generated on the output node N2 of the current integrator circuit 940 while preventing or otherwise minimizing the possibility of saturating the operational amplifier 942 during the current integration operation for the backward pass operation. As schematically illustrated in FIG. 9A, the integration time of the current integrator circuit 940 is dynamically configured by the control circuitry 946 in response to integration time control signals $T1_{MEAS}$_Mode, and $T2_{MEAS}$_Mode that are input to the control circuitry 946. For example, during a forward pass operation, the mode control system 910 asserts the control signal $T1_{MEAS}$_Mode, which instructs the control circuitry 946 to configure the current integrator circuit 940 to perform a current integration operation over the first integration time $T1_{MEAS}$. On the other hand, during a backward pass operation, the mode control system 910 asserts the control signal $T2_{MEAS}$_Mode, which instructs the control circuitry 946 to configure the current integrator circuit 940 to perform a current integration operation over the second integration time $T2_{MEAS}$.

While the control circuitry 946 is generically depicted in FIG. 9A, the control circuitry 946 can be implemented using various control circuit architectures and techniques to perform functions such as controlling the integration period of the current integrator circuit 940, sending a control signal (e.g., ADC_EN) to the ADC circuit 950 to cause the ADC circuit 950 to latch in the output voltage $V_{OUT}$ on the output node N2 at the end of the current integration period, resetting the current integrator circuit 940 by, e.g., setting the voltage on the output node to an initial voltage level (e.g., 0V) to initialize the current integrator circuit 940 in preparation of performing a next current integration process, etc. In this regard, the control circuitry 946 can be configured in various manners depending on the specific circuit framework of the current integrator circuit 940 and hardware interface and configuration between the current integrator circuit 940 and the ADC circuit 950.

In an exemplary embodiment, the control circuitry 946 comprises an integration time counter which counts a number of clock pulses that are input to the integration time counter, wherein the integration time is correlated to a specific count of received clock pulses, as is understood by those of ordinary skill in the art. In this regard, in some embodiments, the integration time of the current integrator circuit 940 is adjusted by configuring the integration time counter circuitry of the control circuitry 946 to perform one of (i) a first counting process which correlates to the first integration time $T1_{MEAS}$ and (ii) a second counting process which correlates to the second integration time $T2_{MEAS}$, in response to the integration time control signals $T1_{MEAS}$_Mode, and $T2_{MEAS}$_Mode.

In addition to increasing the integration time (e.g., $T2_{MEAS}$) of the current integrator circuit 940 for the backward pass operation, in some embodiments, the DAC circuit blocks of the line driver circuitry (e.g., DAC circuit blocks 342 of the column line driver circuitry 340, FIG. 3B) are dynamically configured to increase the pulse duration of the pulse-modulated voltage pulses, which are generated for the digital error signals $\delta_1, \delta_2, \ldots, \delta_n$, in proportion to the increase in the integration time from $T1_{MEAS}$ to $T2_{MEAS}$. For example, FIG. 9B schematically illustrates a process for increasing the pulse durations of analog voltages $V_1, V_2, \ldots, V_n$ which are generated by the DAC circuit blocks and applied to the respective columns C1, C2, . . . , Cn during a backward pass operation.

In the exemplary embodiment of FIG. 9B, it is assumed that the second integration time $T2_{MEAS}$ for the backward pass operation is 2× the first integration time $T1_{MEAS}$ for the forward pass operation. In this regard, the analog voltages $V_1, V_2, \ldots, V_n$ which are generated for the backward pass operation (which correspond to the values of the respective digital error signals $\delta_1, \delta_2, \ldots, \delta_n$) with the increased integration time $T2_{MEAS}$ have respective pulse widths W1_2, W2_2, . . . , Wn_2 which are 2× size of the respective pulse widths W1_1, W2_1, . . . , Wn_1 that would otherwise be generated (in conventional schemes) for a backward pass operation when using the same integration time $T1_{MEAS}$ for the both the forward and backward pass operations. In this regard, the increased integration time $T2_{MEAS}$ together with the increased pulse widths of the analog voltages $V_1, V_2, \ldots, V_n$ for the respective digital error signals $\delta_1, \delta_2, \ldots, \delta_n$, results in an increase in the output voltages $V_{OUT}$ that are generated on the output nodes N2 of the current integrator circuits of the shared readout circuitry for a backward pass operation. This scheme provides for increased output voltages $V_{OUT}$ and enhanced readout of the low level digital error signals $\delta_1, \delta_2, \ldots, \delta_n$, notwithstanding that the current integrator circuits of the shared readout circuitry have fixed size integration capacitors that provide a fixed gain of the current integrator circuits, which is optimal for the forward pass operation.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
an array of resistive processing unit (RPU) cells;
first control lines extending in a first direction across the array of RPU cells, and second control lines extending in a second direction across the array of RPU cells, wherein each RPU cell is connected at an intersection of one of the first control lines and one of the second control lines;
peripheral circuitry coupled to the first control lines and to the second control lines, wherein the peripheral circuitry comprises readout circuitry which is shared by the first control lines and the second control lines; and
a control system operatively coupled to the peripheral circuitry, wherein the control system generates control signals to control the peripheral circuitry to perform a first operation on the array of RPU cells and to perform a second operation on the array of RPU cells;
wherein the control signals comprise:
  a first configuration control signal to configure the readout circuitry to have a first hardware configuration when the first operation is performed on the array of RPU cells, to enable readout of signals in a first output signal range; and
  a second configuration control signal to configure the readout circuitry to have a second hardware configuration, which is different from the first hardware configuration, when the second operation is performed on the array of RPU cells, to enable readout of signals in a second output signal range, which is smaller than the first output signal range.

2. The device of claim 1, wherein:
the peripheral circuitry further comprises control line voltage driver circuitry and multiplexer circuitry; and
the control signals further comprise a multiplexer control signal to cause the multiplexer circuitry to selectively connect the readout circuitry to the first control lines and connect the control line voltage driver circuitry to the second control lines to perform the first operation, and to cause the multiplexer circuitry to selectively connect the readout circuitry to the second control lines and connect the control line voltage driver circuitry to the first control lines to perform the second operation.

3. The device of claim 2, wherein:
first operation comprises a forward pass operation of a neural network training process which is performed on the array of RPU cells, wherein the array of RPU cells comprise an array of artificial synaptic elements of a neural network which connect an upstream layer of artificial neurons of the neural network and a downstream layer of artificial neurons of the neural network;
the second operation comprises a backward pass operation of the neural network training process which is performed on the array of RPU cells;
for the first operation, the control line voltage driver circuitry applies first voltage pulses to one or more of the second control lines, wherein the first voltage pulses represent a digital input signal received from the upstream layer of the neural network, and the readout circuitry with the first hardware configuration receives first current signals which are generated by the RPU cells and output on the first control lines in response to the first voltage pulses, and generates a first digital output signal which represents the first current signals output from the first control lines;

for the second operation, the control line voltage driver circuitry applies second voltage pulses to one or more of the first control lines, wherein the second voltage pulses represent a digital error signal received from the downstream layer of the neural network, and the readout circuitry with the second hardware configuration receives second current signals which are generated by the RPU cells and output on the second control lines in response to the second voltage pulses, and generates a second digital output signal which represents the second current signals output from the second control lines.

4. The device of claim 1, wherein the readout circuitry comprises a plurality of readout circuit blocks, each readout circuit block comprising:
   a current integrator circuit comprising an input node and an output node; and
   an analog-to-digital converter circuit having an input connected to the output node of the current integrator circuit;
   wherein the current integrator circuit comprises:
   an operational amplifier having an inverting input terminal connected to the input node, and an output terminal connected to the output node;
   a first integrating capacitor and a first switch serially connected in a first feedback path between the input node and the output node of the current integrator circuit, wherein the first integrating capacitor has a first capacitance;
   a second integrating capacitor and a second switch serially connected in a second feedback path between the input node and the output node of the current integrator circuit, wherein the second integrating capacitor has a second capacitance, which is less than the first capacitance;
   wherein the first configuration control signal activates the first switch and deactivates the second switch to configure the current integrator circuit to have a first gain based the first capacitance of the first integrating capacitor connected in the first feedback path between the output node and the input node of the current integrator circuit; and
   wherein the second configuration control signal activates the second switch and deactivates the first switch to configure the current integrator circuit to have a second gain, which is greater than the first gain, based the second capacitance of the second integrating capacitor connected in the second feedback path between the output node and the input node of the current integrator circuit.

5. The device of claim 1, wherein the readout circuitry comprises a plurality of readout circuit blocks, each readout circuit block comprising:
   a current integrator circuit comprising an input node and an output node;
   a selection circuit connected to the output node of the current integrator circuit;
   a first analog-to-digital converter circuit connected to a first output of the selection circuit, wherein the first analog-to-digital converter circuit comprises a first least significant bit (LSB) voltage resolution; and
   a second analog-to-digital converter circuit connected to a second output of the selection circuit, wherein the second analog-to-digital converter circuit comprises a second LSB voltage resolution, which is greater than the first LSB voltage resolution;
   wherein the first configuration control signal causes the selection circuit to selectively connect the output node of the current integrator circuit to the first analog-to-digital converter circuit; and
   wherein the second configuration control signal causes the selection circuit to selectively connect the output node of the current integrator circuit to the second analog-to-digital converter circuit.

6. The device of claim 1, wherein the readout circuitry comprises a plurality of readout circuit blocks, each readout circuit block comprising:
   a current integrator circuit comprising an input node and an output node;
   a selection circuit connected to the output node of the current integrator circuit;
   a first analog-to-digital converter circuit connected to a first output of the selection circuit, wherein the first analog-to-digital converter circuit comprises a first gain;
   a second analog-to-digital converter circuit connected to a second output of the selection circuit, wherein the second analog-to-digital converter circuit comprises a second gain, which is greater than the first gain;
   wherein the first configuration control signal causes the selection circuit to selectively connect the output node of the current integrator circuit to the first analog-to-digital converter circuit; and
   wherein the second configuration control signal causes the selection circuit to selectively connect the output node of the current integrator circuit to the second analog-to-digital converter circuit.

7. The device of claim 1, wherein the readout circuitry comprises a plurality of readout circuit blocks, each readout circuit block comprising:
   a selection circuit comprising a first input connected to a first control line of the first control lines, a second input connected to a second control line of the second control lines, a first output, and a second output;
   a first current integrator circuit comprising an input node and an output node, wherein the input node of the first current integrator circuit is coupled to the first output of the selection circuit;
   a first analog-to-digital converter circuit connected to the output node of the first current integrator circuit, wherein the first analog-to-digital converter circuit comprises a first least significant bit (LSB) voltage resolution;
   a second current integrator circuit comprising an input node and an output node, wherein the input node of the second current integrator circuit is coupled to the second output of the selection circuit; and
   a second analog-to-digital converter circuit connected to the output node of the second current integrator circuit, wherein the second analog-to-digital converter circuit comprises a second LSB voltage resolution, which is greater than the first LSB voltage resolution;
   wherein the first configuration control signal causes the selection circuit to selectively connect the first control line to the input node of the first current integrator circuit; and wherein the second configuration control signal causes the selection circuit to selectively connect the second control line to the input node of the second current integrator circuit.

8. The device of claim 7, wherein:
the first current integrator circuit comprises a first operational amplifier having an inverting input terminal connected to the input node, and an output terminal connected to the output node of the first current integrator circuit, and a first integrating capacitor connected in a feedback path between the input node and the output node of the first current integrator circuit, wherein the first integrating capacitor has a first capacitance; and
the second current integrator circuit comprises a second operational amplifier having an inverting input terminal connected to the input node, and an output terminal connected to the output node of the second current integrator circuit, and a second integrating capacitor connected in a feedback path between the input node and the output node of the second current integrator circuit, wherein the second integrating capacitor has a second capacitance which is substantially equal to the first capacitance.

9. The device of claim 1, wherein the readout circuitry comprises a plurality of readout circuit blocks, each readout circuit block comprising:
a selection circuit comprising a first input connected to a first control line of the first control lines, a second input connected to a second control line of the second control lines, a first output, and a second output;
a first current integrator circuit comprising an input node and an output node, wherein the input node of the first current integrator circuit is coupled to the first output of the selection circuit;
a first analog-to-digital converter circuit connected to the output node of the first current integrator circuit, wherein the first analog-to-digital converter circuit comprises a first gain;
a second current integrator circuit comprising an input node and an output node, wherein the input node of the second current integrator circuit is coupled to the second output of the selection circuit; and
a second analog-to-digital converter circuit connected to the output node of the second current integrator circuit, wherein the second analog-to-digital converter circuit comprises a second gain, which is greater than the first gain;
wherein the first configuration control signal causes the selection circuit to selectively connect the first control line to the input node of the first current integrator circuit; and
wherein the second configuration control signal causes the selection circuit to selectively connect the second control line to the input node of the second current integrator circuit.

10. The device of claim 1, wherein the readout circuitry comprises a plurality of readout circuit blocks, each readout circuit block comprising:
a current integrator circuit comprising an input node and an output node; and
an analog-to-digital converter circuit connected to the output node of the current integrator circuit, wherein the analog-to-digital converter circuit comprises a configurable least significant bit (LSB) voltage resolution comprising a first LSB voltage resolution, and a second LSB voltage resolution which is greater than the first LSB voltage resolution;
wherein the first configuration control signal configures the analog-to-digital converter circuit to have the first LSB voltage resolution; and
wherein the second configuration control signal configures the analog-to-digital converter circuit to have the second LSB voltage resolution.

11. The device of claim 1, wherein the readout circuitry comprises a plurality of readout circuit blocks, each readout circuit block comprising:
a current integrator circuit comprising an input node and an output node; and
an analog-to-digital converter circuit connected to the output node of the current integrator circuit, wherein the analog-to-digital converter circuit comprises a configurable gain comprising a first gain, and a second gain which is greater than the first gain;
wherein the first configuration control signal configures the analog-to-digital converter circuit to have the first gain; and
wherein the second configuration control signal configures the analog-to-digital converter circuit to have the second gain.

12. The device of claim 1, wherein the readout circuitry comprises a plurality of readout circuit blocks, each readout circuit block comprising:
a current integrator circuit comprising an input node and an output node; and
an analog-to-digital converter circuit connected to the output node of the current integrator circuit;
wherein the current integrator circuit comprises a configurable integration period comprising a first integration period and a second integration period, which is greater than the first integration period;
wherein the first configuration control signal configures the current integrator circuit to perform a current integration process with the first integration period; and
wherein the second configuration control signal configures the current integrator circuit to perform a current integration process with the second integration period.

13. The device of claim 12, wherein the peripheral circuitry further comprises control line voltage driver circuitry, wherein the control line voltage driver circuitry comprises configurable pulse-width modulation circuitry which is responsive to the first configuration control signal to generate voltage pulses with first pulse durations that are proportional to the first integration period, and which is responsive to the second configuration control signal to generate voltage pulses with second pulse durations that are proportional to the second integration period.

14. A method comprising:
performing a first operation on an array of resistive processing unit (RPU) cells, the array of RPU cells coupled to row lines and column lines that share readout circuitry;
configuring the readout circuitry to have a first hardware configuration to perform the first operation on the array of RPU cells, to enable readout of signals in a first output signal range;
performing a second operation on the array of array of RPU cells; and
configuring the readout circuitry to have a second hardware configuration to perform the second operation on the array of RPU cells, wherein the second hardware configuration of the readout circuitry is different from the first hardware configuration of the readout circuitry, to enable readout of signals in a second output signal range, which is smaller than the first output signal range.

15. The method of claim 14, wherein:
the first operation comprises a forward pass operation of a neural network training process which is performed on the array of RPU cells, wherein the array of RPU cells comprise an array of artificial synaptic elements which connect an upstream layer of artificial neurons and a downstream layer of artificial neurons;
the second operation comprises a backward pass operation of the neural network training process which is performed on the array of RPU cells.

16. The method of claim 14, wherein:
configuring the readout circuitry to have a first hardware configuration comprises configuring a current integrator circuit of the readout circuitry to have a first integration capacitance; and
configuring the readout circuitry to have a second hardware configuration comprises configuring the current integrator circuit of the readout circuitry to have a second integration capacitance, which is less than the first integration capacitance.

17. The method of claim 14, wherein:
configuring the readout circuitry to have a first hardware configuration comprises configuring an analog-to-digital converter circuit of the readout circuitry to have a first least significant bit (LSB) voltage resolution; and
configuring the readout circuitry to have a second hardware configuration comprises configuring the analog-to-digital converter circuit of the readout circuitry to have a second LSB voltage resolution, which is greater than the first LSB voltage resolution.

18. The method of claim 14, wherein:
configuring the readout circuitry to have a first hardware configuration comprises configuring an analog-to-digital converter circuit of the readout circuitry to have a first gain; and
configuring the readout circuitry to have a second hardware configuration comprises configuring the analog-to-digital converter circuit of the readout circuitry to have a second gain, which is greater than the first gain.

19. A system, comprising:
a neuromorphic computing system comprising:
an array of resistive processing unit (RPU) cells, first control lines extending in a first direction across the array of RPU cells, and second control lines extending in a second direction across the array of RPU cells, wherein each RPU cell is connected at an intersection of one of the first control lines and one of the second control lines, wherein the array of RPU cells comprise an array of artificial synaptic elements which store synaptic weights that represent connection strengths between artificial neurons of an upstream layer of the neuromorphic computing system and artificial neurons of a downstream layer of the neuromorphic computing system, wherein the synaptic weights are encoded by conductance values of resistive devices of RPU cells;
peripheral circuitry coupled to the first control lines and to the second control lines, wherein the peripheral circuitry comprises readout circuitry which is shared by the first control lines and the second control lines; and
a control system operatively coupled to the peripheral circuitry, wherein the control system generates control signals to control the peripheral circuitry to perform a first operation on the array of RPU cells and to perform a second operation on the array of RPU cells;
wherein the control signals comprise:
a first configuration control signal to configure the readout circuitry to have a first hardware configuration when the first operation is performed on the array of RPU cells, to enable readout of signals in a first output signal range, wherein the first operation comprises a forward pass operation of a neural network training process; and
a second configuration control signal to configure the readout circuitry to have a second hardware configuration, which is different from the first hardware configuration, when the second operation is performed on the array of RPU cells, to enable readout of signals in a second output signal range, which is smaller than the first output signal range, wherein the second operation comprises a backward pass operation of the neural network training process.

20. The system of claim 19, wherein:
the peripheral circuitry further comprises control line voltage driver circuitry and multiplexer circuitry;
wherein the control signals further comprise a multiplexer control signal to cause the multiplexer circuitry to selectively connect the readout circuitry to the first control lines and connect the control line voltage driver circuitry to the second control lines to perform the first operation, and to cause the multiplexer circuitry to selectively connect the readout circuitry to the second control lines and connect the control line voltage driver circuitry to the first control lines to perform the second operation;
for the first operation, the control line voltage driver circuitry applies first voltage pulses to one or more of the second control lines, wherein the first voltage pulses represent a digital input signal received from the upstream layer, and the readout circuitry with the first hardware configuration receives first current signals which are generated by the RPU cells and output on the first control lines in response to the first voltage pulses, and generates a first digital output signal which represents the first current signals output from the first control lines;
for the second operation, the control line voltage driver circuitry applies second voltage pulses to one or more of the first control lines, wherein the second voltage pulses represent a digital error signal received from the downstream layer, and the readout circuitry with the second hardware configuration receives second current signals which are generated by the RPU cells and output on the second control lines in response to the second voltage pulses, and generates a second digital output signal which represents the second current signals output from the second control lines.

* * * * *